United States Patent
Doken et al.

(10) Patent No.: US 12,457,380 B2
(45) Date of Patent: Oct. 28, 2025

(54) SYSTEMS AND METHODS FOR SHARING MEDIA ITEMS

(71) Applicant: Adeia Guides Inc., San Jose, CA (US)

(72) Inventors: Serhad Doken, Bryn Mawr, PA (US); Jean-Yves Couleaud, Mission Viejo, CA (US); Ning Xu, Irvine, CA (US); Zhiyun Li, Kenmore, WA (US)

(73) Assignee: Adeia Guides Inc., San Jose, CA (US)

( * ) Notice: Subject to any disclaimer, the term of this patent is extended or adjusted under 35 U.S.C. 154(b) by 104 days.

(21) Appl. No.: 18/371,326

(22) Filed: Sep. 21, 2023

(65) Prior Publication Data

US 2025/0106465 A1 Mar. 27, 2025

(51) Int. Cl.
| | | |
|---|---|---|
| H04N 21/431 | (2011.01) |
| H04N 21/43 | (2011.01) |
| H04N 21/44 | (2011.01) |
| H04N 21/45 | (2011.01) |
| H04N 21/472 | (2011.01) |
| H04N 21/475 | (2011.01) |

(52) U.S. Cl.
CPC ... *H04N 21/4312* (2013.01); *H04N 21/43076* (2020.08); *H04N 21/44008* (2013.01); *H04N 21/4532* (2013.01); *H04N 21/472* (2013.01); *H04N 21/4753* (2013.01)

(58) Field of Classification Search
CPC ......... H04N 21/4312; H04N 21/43076; H04N 21/44008; H04N 21/4532; H04N 21/472; H04N 21/4753
See application file for complete search history.

(56) References Cited

U.S. PATENT DOCUMENTS

| | | | |
|---|---|---|---|
| 9,619,123 B1 * | 4/2017 | Hughes | H04N 21/4394 |
| 10,104,403 B1 * | 10/2018 | Ekambaram | H04N 21/8126 |
| 10,984,572 B1 * | 4/2021 | Zacharia | G06T 11/60 |
| 2008/0133638 A1 * | 6/2008 | Fischer | H04N 21/25883 |
| | | | 709/201 |

(Continued)

OTHER PUBLICATIONS

"How to Recommend a Movie or Show to a Friend in Netflix," [retrieved from URL: https://forums.tomsguide.com/faq/how-to-recommend-a-movie-or-show-to-a-friend-in-netflix.206821/], 1-4 (2018).

(Continued)

*Primary Examiner* — Fernando Alcon
(74) *Attorney, Agent, or Firm* — HALEY GUILIANO LLP

(57) ABSTRACT

System and method are provided for sharing a counterpart version of a media asset. A media application generates for display a first media asset on a first device associated with a first user profile. The media application determines that a second device associated with a second user profile is generating for display a second media asset and the second user profile is designated to share a counterpart version of media consumed in association with the second user profile with the first device. The media application identifies a time to share a counterpart version of the second media asset. At the identified time, the media application generates for display an overlay over the display of the first media asset on the first device. The overlay comprises the counterpart version of the second media asset and a plurality of user interface options.

19 Claims, 14 Drawing Sheets

(56) References Cited

U.S. PATENT DOCUMENTS

| | | | | |
|---|---|---|---|---|
| 2010/0043020 | A1* | 2/2010 | Basso | H04N 21/6582 |
| | | | | 725/40 |
| 2013/0195422 | A1* | 8/2013 | Patil | H04N 21/6581 |
| | | | | 386/E5.028 |
| 2014/0201767 | A1* | 7/2014 | Seiden | H04N 21/4325 |
| | | | | 725/12 |
| 2014/0363141 | A1* | 12/2014 | Bonhomme | G11B 27/031 |
| | | | | 386/278 |
| 2015/0163558 | A1* | 6/2015 | Wheatley | H04N 21/25891 |
| | | | | 725/12 |
| 2016/0012048 | A1* | 1/2016 | Yellin | H04N 21/4751 |
| | | | | 707/722 |
| 2016/0134922 | A1* | 5/2016 | Bogers | H04N 21/858 |
| | | | | 725/80 |
| 2016/0307599 | A1* | 10/2016 | Snell | H04N 21/8456 |
| 2016/0323647 | A1* | 11/2016 | Yan | H04N 21/27 |
| 2017/0034583 | A1* | 2/2017 | Long | H04N 21/4788 |
| 2017/0164060 | A1* | 6/2017 | Blong | H04N 21/4667 |
| 2017/0214945 | A1* | 7/2017 | Chang | H04W 4/80 |
| 2017/0289589 | A1* | 10/2017 | Koumchatzky | H04N 21/251 |
| 2018/0014066 | A1* | 1/2018 | Berman | H04N 21/439 |
| 2018/0191653 | A1* | 7/2018 | Aggarwal | H04N 21/4312 |
| 2018/0220189 | A1* | 8/2018 | Hodge | G06F 16/7837 |
| 2021/0084377 | A1* | 3/2021 | Taylor | H04N 21/4788 |
| 2022/0174339 | A1* | 6/2022 | Moros Ortiz | H04N 21/23418 |
| 2023/0017614 | A1* | 1/2023 | Srinivasa | G06V 20/42 |
| 2023/0300429 | A1* | 9/2023 | Chen | G06F 3/0482 |
| | | | | 386/241 |
| 2024/0357214 | A1* | 10/2024 | Fuchs | H04N 21/84 |

OTHER PUBLICATIONS

"See what your friends are listening to, "[retrieved from URL: https://support.apple.com/guide/iphone/see-what-your-friends-are-listening-to-iphdf490a9e9/ios on Oct. 16, 2023], 4 pages.

* cited by examiner

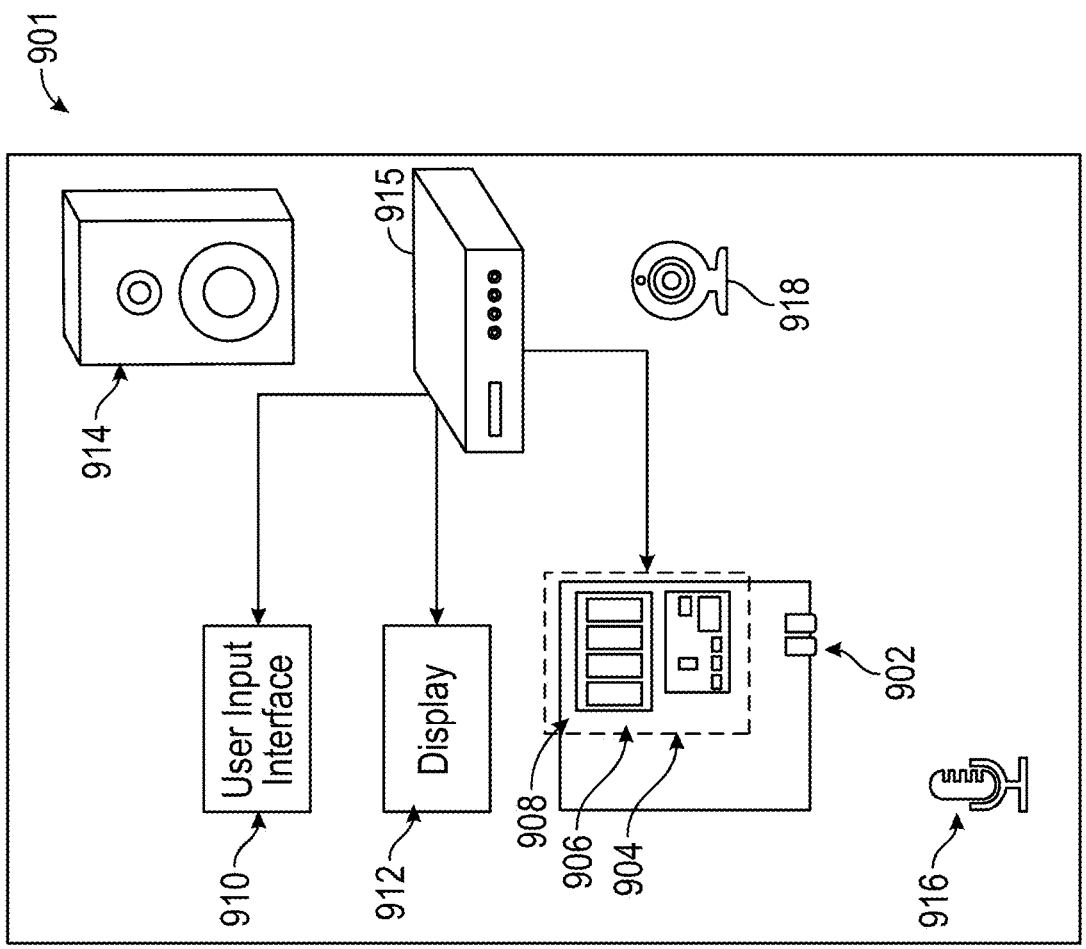
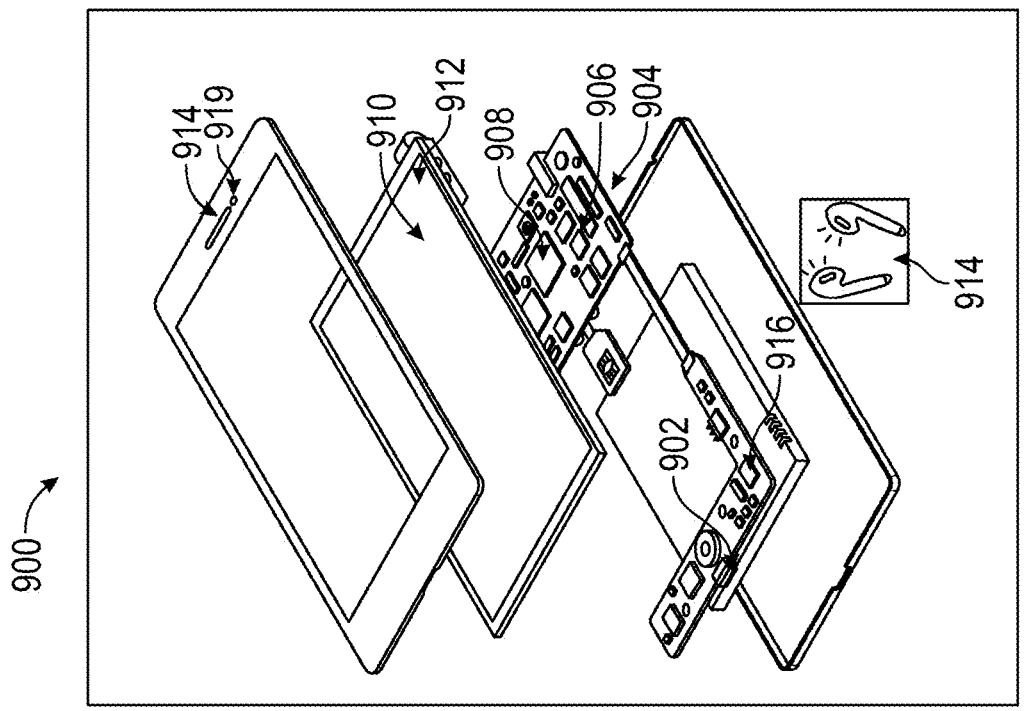
FIG. 9

SYSTEMS AND METHODS FOR SHARING MEDIA ITEMS

BACKGROUND

This disclosure relates to systems and methods for sharing media assets among user devices associated with user profiles.

SUMMARY

Streaming services provide a plethora of media for consumption by user devices. With so many options, it is a cumbersome task for media systems to create user interfaces for selection of media to consume. If user interfaces of media systems fail to provide appropriate recommendations, users are left on their own to find content to consume from vast catalogues of media. Media may be shared between users by way of manual sharing. For example, a media system can provide a "Share" option to copy a link to a media asset. In another example, media systems provide a messaging application option to paste the link into and send the link to a recipient selected by the user. In order to send a segment of a media asset, media systems provide only manual options to clip the media asset before copying a link to the segment. Finally, the recipient or recipients of the shared media must click the link to watch the shared media. In another example, media systems may provide manual access to the user's watch history or media favorites to browse content recommended by the user.

In another example, media may be shared via a collaborative playlist. For example, a media system provides an option to a user to create a playlist of media assets. In this example, the media system provides an option to the user to allow another user to edit the playlist of media assets. The media system provides access to see the media assets recommended by the user to the other user that is allowed to edit the playlist of media assets. In another example, a media system shares, with an administrative device, media assets currently displayed on devices managed by the administrative device. In this example, one device is associated with an administrator account that oversees accounts associated with devices. The media system shares with the administrative device associated with the administrator account the media assets consumed in association with the other devices.

These approaches are deficient because the system cannot immediately share the media asset or media asset segment with other devices. Instead, the media asset can only be shared with significant time delay and with a manual intervention of the user. Moreover, the recipient of the shared media asset may have already seen the shared media asset by the time they open the shared link. Even worse, the system cannot guarantee that a recipient will see the shared media at all because the recipient may not receive a notification. Additionally, the user may get discouraged by all the manual selections necessary to share media and decide not the share media. Accordingly, there is a need for systems and user interfaces that provide shared media recommendations in timely manner and in a manner in which they are likely to be consumed.

To address these problems, in some embodiments, a Media Recommendation System (MRS) leverages data indicating that a first user profile and a second user profile belong to a single user account. For example, a single Iflix (a streaming online media service) account may have up to five user profiles. A first device associated with the first user profile may designate a second device associated with a second user profile to share media recommendations. In some embodiments, a first media asset on a first device is associated with a first user profile.

The MRS determines that a second device that is associated with a second user profile is generating for display a second media asset and that the second user profile is designated to share a counterpart version of media that is consumed in associated with the second user profile with the first device. The counterpart version of media is a version of the second media asset that is representative of the second media asset. In some embodiments, the counterpart version of media is a synchronized version of the media that is consumed in association with the second user profile. In some embodiments, the counterpart version of media is a static image representative of the media that is consumed in association with the second user profile. For example, Alice and Bob both have user profiles on the same account. Alice designates that Bob can share a counterpart version of what he is watching on his device with Alice's device.

In some embodiments, the MRS synchronizes the counterpart version of the second media asset that comprises the overlay over the display of the first media asset on the first device with display of the second media asset at the second device. Such aspects allow the MRS to share media with user devices associated with designated user profiles with no time delay. In some embodiments, the counterpart version of the second media asset that comprises the overlay over the display of the first media asset on the first device is offset in time from display of the second media asset at the second device.

The MRS then identifies a time to share a counterpart version of the second media asset with the first device associated with the first user profile. The identified time is identified based on analyzing at least one of the first media asset or the second media asset. At the identified time, the MRS generates for display an overlay over the display of the first media asset on the first device. The overlay comprises the counterpart version of the second media asset generated for display on the second device at the identified time and a plurality of user interface options related to consumption of the second media asset.

Such aspects allow for the MRS to eliminate a time delay when sharing media asset recommendations between user devices. Since a counterpart version of the second media asset is displayed as an overlay over the first media asset, the first user device can immediately receive a media asset recommendation of what the second user device is watching. The second user device does not need to manually share what media asset is being consumed, as the MRS automatically shares a counterpart version of what is consumed in association with the second user profile with the first user profile. Such aspects allow for the MRS to effectively provide recommendations of media to user devices because automatic nature of the recommendations ensures that the recommendations will be received.

In some embodiments, the MRS determines a particular time when the first media asset on the first device associated with the first user profile is displaying a slow-paced scene and the second device associated with the second user profile is displaying a high-paced scene during the particular time. In some embodiments, the MRS determines that the first device associated with the first user profile is displaying the slow-paced scene by determining that a rate of I-frames in the first media asset is below a threshold rate. Such embodiments are useful in the case of variable bit rate (VBR) streaming. In such approaches, the MRS determines that the second device associated with the second user profile is displaying the high-paced scene by determining that a rate of I-frames in the second media asset is above the threshold rate. In such approaches, the particular time is selected to be the identified time. In other embodiments, the MRS determines that the first device associated with the first user profile is displaying the slow-paced scene by analyzing displayed scenes with a trained AI model.

Such aspects allow the MRS to provide user devices with media recommendations at optimal times based on the frequency of I-frames of the first media asset and the second media asset. Video decoding may be done by a CPU, GPU, any other suitable circuitry or combination thereof. Decoding one video with high I-frame densities can take much of a CPU's resources, let alone decoding two videos with dense I-frames. If both the first and second media asset had high I-frame frequencies, the CPU's resources may be overloaded and lead to degraded frame rate or yield artifacts. Thus, it is beneficial to limit the decoding load of the CPU.

Such aspects also allow the MRS to provide an optimal user experience. For example, when a first user device is displaying a slow-paced scene, the first user is more likely to watch the counterpart version of the second media asset. The fast-paced scene of the second media asset entices the first user to watch the counterpart version in the overlay or to add the second media asset to their watchlist. If the first device associated with the first user profile was also consuming a fast-paced scene, the first user would not be able to pay attention to the counterpart version of the second media asset because they would be distracted by the first media asset.

In some embodiments, the identified time to share the counterpart version of the second media asset with the first device associated with the first user profile is identified based on a time when the second device that is associated with the second user profile is generating for display a portion of the second media asset with metadata that matches data in the first user profile. In other approaches, the identified time to share the counterpart version of the second media asset with the first device associated with the first user profile is identified based on a time when the second device that is associated with the second user profile is generating for display a portion of the second media asset with metadata that corresponds with data in the first user profile. For example, if the first user profile data indicates interest in an actor, such as Reese Witherspoon, the MRS will share the counterpart version of the second media asset during a time when the second media asset is displaying a scene with Reese Witherspoon.

Such aspects allow for the MRS to effectively provide recommendations of media to user devices. The MRS identifying a time when the metadata of the second media asset matches data in the first user profile results in more user interactions with the overlay and increases the probability that the first device associated with the first user profile will consume the second media asset.

In some embodiments, the MRS generates for display the overlay for a period of time. The period of time is determined based on at least one of a length of a currently-playing scene of the first media asset or a length of a currently-playing scene of the counterpart version of the second media asset. In some embodiments, the overlay of the counterpart version of the second media asset is periodically generated for display over the display of the first media asset. Periods for the periodic generation of the counterpart version of the second media asset are determined based on a time counter. In such approaches, in response to the MRS determining that the second device is generating for display a third media asset different from the second media asset, the time counter resets. In response to the determining, an overlay of a counterpart version of the third media asset is generated for display over the display of the first media asset. Periods for the periodic generation of the counterpart version of the third media asset are determined based on the reset time counter.

The periods of time based on the lengths of currently-playing scenes allow for sufficient time for the display of the shared, second media asset without excessive disruption of the first media asset. Such aspects allow for the MRS to generate for display the overlay of the counterpart version of a media asset each time a user profile switches the media asset being consumed. This allows the MRS to sufficiently share all the media consumed by the second user profile. The periodic generation of the counterpart version of the second media asset determined based on a time counter allows for the MRS to generate for display the overlay frequently without excessive disruption of the first media asset.

In some embodiments, the overlay comprises a current geographic location of the second device associated with the second user profile. The overlay also comprises an option to log out the second user profile of the user account, and an option to change the user account's password. Such aspects allow the overlay to serve as a security feature. If the second device is in an unfamiliar location, this could mean that someone that the user account owner does not know has signed into and is using the user account. For example, Alice is in the United States and sees that Eve has a second device that is logged into Alice's account from Ecuador. Alice knows that there should not be someone logged into her account from Ecuador, so Alice may choose to log out Eve. In such approaches, the MRS provides the user account owner the ability to have more control over who has access to the user account.

In some embodiments, the MRS receives, via a social networking application, a request from the first user profile to follow the second user profile. In response to receiving the follow request, the MRS authorizes the second user profile to share counterpart versions of media that is consumed in associated with the second user profile with the first device. Such aspects allow the MRS to provide shared media assets to a larger pool of users, for example, followers of celebrities and influencers.

In some embodiments, the MRS generates for display, at the overlay, an option to like the second media asset at the first device. In response to receiving a like of the second media asset at the first device, the MRS sends a notification to the second device that the first user profile likes the second media asset.

In some embodiments, the plurality of user interface options related to consumption of the second media asset comprises options to: terminate display of the overlay, add the second media asset to a watch list associated with the first user profile, minimize the display of the overlay, and receive metadata of the second media asset. Such aspects allow the MRS to share the second media asset without obstructing the view of the first media asset. Such aspects allow the MRS to receive more user interactions with the overlay and with the second media asset. Such aspects allow the MRS to share information about the second media asset with the first device associated with the first user profile.

In some embodiments, the plurality of user interface options related to consumption of the second media asset comprises options to: terminate the generating for display the first media asset and begin generating for display the second media asset at the first device, and send a notification to the second device to join a watch party of the second media asset with the first device.

In some embodiments, the MRS identifies a parental control rating of the second media asset. The MRS then determines that the parental control rating of the second media asset is appropriate, allowed, or authorized for the first user profile. In response to the identifying and the determining, the MRS generates for display the overlay over the display of the first media asset on the first device. Such aspects allow the MRS to share only appropriately-rated media assets with, for example, devices associated with kids' profiles. Alternatively, the MRS can serve a parental control functionality. For example, a parent may designate their child's profile to share counterpart versions of media that is consumed in association with the child's profile. The parent can clearly see if the media asset being consumed by the child's profile is appropriate for the child. In some embodiments, the parent profile may restrict the child profile from continuing consumption of the media asset.

In some embodiments, the MRS determines that the second media asset is not included in a watch history of the first user profile. In response to the determining, the MRS generates for display the overlay over the display of the first media asset on the first device. Such aspects allow the MRS to avoid recommending media assets that a user has already consumed and therefore will not want to consume again.

In some embodiments, the MRS determines that the second media asset is included in a watch history of both the first user profile and the second user profile. In these embodiments, the MRS determines that a viewing progress of the second media asset for the first user profile is greater than a viewing progress of the second media asset for the second user profile. In response to the determining, the MRS generates for display the overlay over the display of the first media asset on the first device. Such aspects allow the MRS to avoid sharing media assets containing spoilers.

In some embodiments, the MRS, in response to the MRS generating for display the overlay over the display of the first media asset on the first device, notifies the second device that the first device is generating for display the overlay over the display of the first media asset on the first device. Such aspects allow the MRS to provide the second device with a notification that the second media asset that is being consumed in association with the second user profile is being shared with the first device associated with the first user profile.

In some embodiments, the MRS detects an orientation of the second device during consumption of the second media asset. In such embodiments, the MRS generates for display a picture-in-picture (PIP) display of the counterpart version of the second media asset in the orientation of the second device. Such aspects allow the MRS to share the type of device of the second device with the first device associated with the first user profile. In another embodiment, after the MRS detects an orientation of the second device during consumption of the second media asset, the MRS generates for display a PIP display of the counterpart version of the second media asset in the orientation of the first device. Such aspects allow the MRS to share a counterpart version of the second media asset in an orientation that better suits the display of the first device.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIGS. 9-10 describe illustrative devices, systems, servers, and related hardware for sharing a counterpart version of a media asset from one device with another device, in accordance with some embodiments of this disclosure.

DETAILED DESCRIPTION

Figure 1:
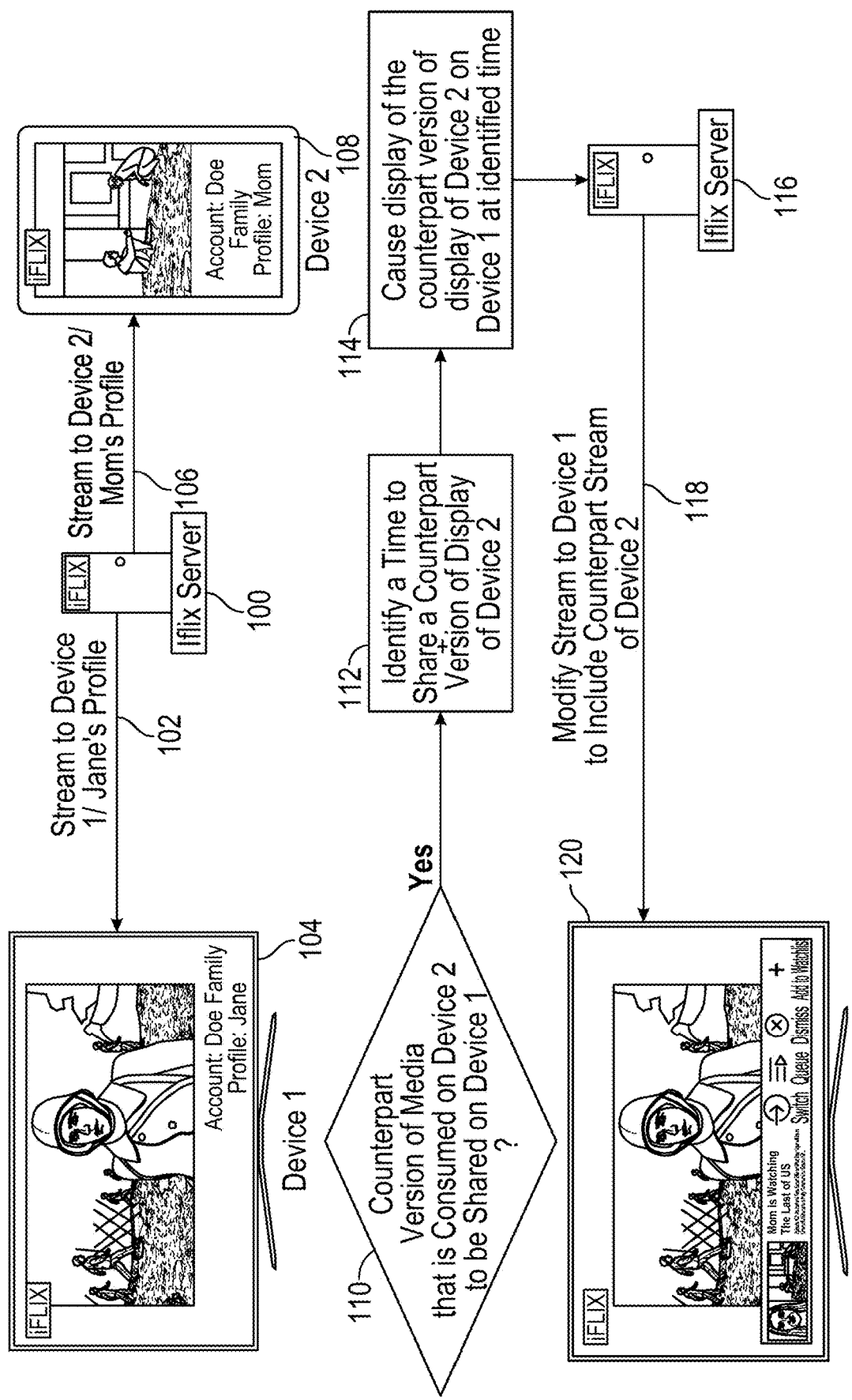
FIG. 1 shows an illustrative example of sharing a counterpart version of a media asset from one device with another device, in accordance with some embodiments of this disclosure.
Figure 10:
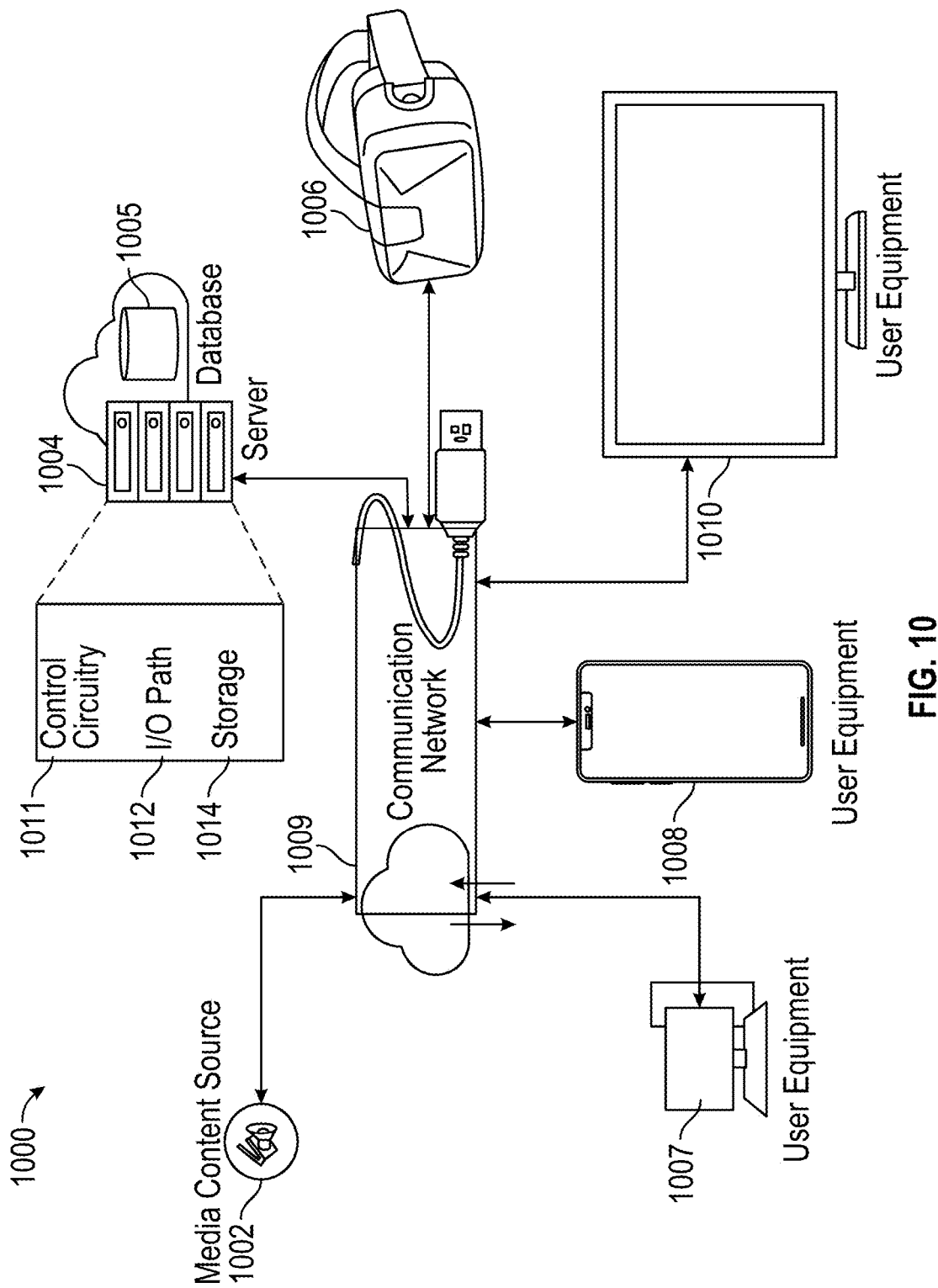

FIG. 1 depicts a system, e.g., a Media Recommendation System (MRS), for sharing a counterpart version of a media asset from one device with another device, in accordance with some embodiments of this disclosure. In some embodiments, a media application runs a Media Recommendation System (MRS), e.g., on one or more devices 1004, 1006, 1007, 1008, 1010 as shown in FIG. 10. In some implementations, the media application runs on a server, a user equipment device, such as a laptop, smartphone, tablet, television, or any other suitable device or any combination thereof.

In some examples, a server (e.g., server 100) while executing the media application, provides a first set of streaming data (e.g., at step 102) for a first device (e.g., device 104) running the media application and a second set of streaming data (e.g., at step 106) for a second device (e.g., device 108) running the media application. In some embodiments, first device and second device are associated with the same user account. For example, the members of the Doe family all use one user account for Iflix, a streaming service. A user account is created when a user equipment device requests access to a streaming service or any other suitable media provider. A user account provides user equipment devices access to a streaming service's media catalogue. A user account has one set of credentials that allow access to the account.

One user account may have multiple user profiles. For example, one Iflix account may have up to five user profiles. In some embodiments, a device running the media application logged into a user account accepts payment in return for more user profiles. For example, a media application may have a tiered subscription service where higher tiers correspond to more user profiles within one user account. In this example, users pay more for a higher subscription tier. All user profiles within one user account are accessed using the same credentials. An individual user profile is accessed when the media application receives a user interface selection of a specific user profile on a menu page for the user account. Each user profile includes a watch history, recommended media, and other personalized features unique to each user profile. This allows streaming services, e.g., Iflix, to track media consumption for individual user profiles. For example, Jane Doe uses the same user account as Mom, however Jane's user profile includes Jane's watch history and Mom's user profile includes Mom's watch history.

In some embodiments, server 100 receives a request for media from a first device (e.g., device 104). "Media" refers to movies, TV shows, video games, VR games, Internet videos, or any other suitable media asset. For example, an Iflix server, e.g., server 100, receives a request for the movie "All Quiet on the Western Front" from the first device (e.g., device 104). The first device accepts input from a user using, e.g., input/output circuitry 912. Requests can be inputted from, e.g., a touchscreen, a button on a remote, within a VR experience, a mouse, a keyboard, any other suitable input device associated with first device (e.g., device 104), or any combination thereof. For example, server 100 receives a request for "All Quiet on the Western Front" from device 104 associated with Jane's user profile made by a remote control.

In some embodiments, server 100 receives a request for media from a second device (e.g., device 108). For example, server 100 receives a request for "The Last of Us" from device 108 associated with Mom's user profile made by a touch on a touchscreen. At step 102, an Iflix server, e.g., server 100, streams "All Quiet on the Western Front" to the first device (e.g., device 104). At step 106, the Iflix server, e.g., server 100, streams "The Last of Us" to the second device (e.g., device 108). The media assets stream using HLS, MPEG-DASH, RTMP, WebRTC, any other suitable streaming protocol or any combination thereof. Server 100 communicates with one or more devices via a communication network, e.g., communication network 1009 of FIG. 10. A communication network refers to local area network (LAN), metropolitan area network (MAN), wide area network (WAN), any other suitable network or any combination thereof. For example, the movie "All Quiet on the Western Front" may stream using HLS on LAN.

Figure 4:
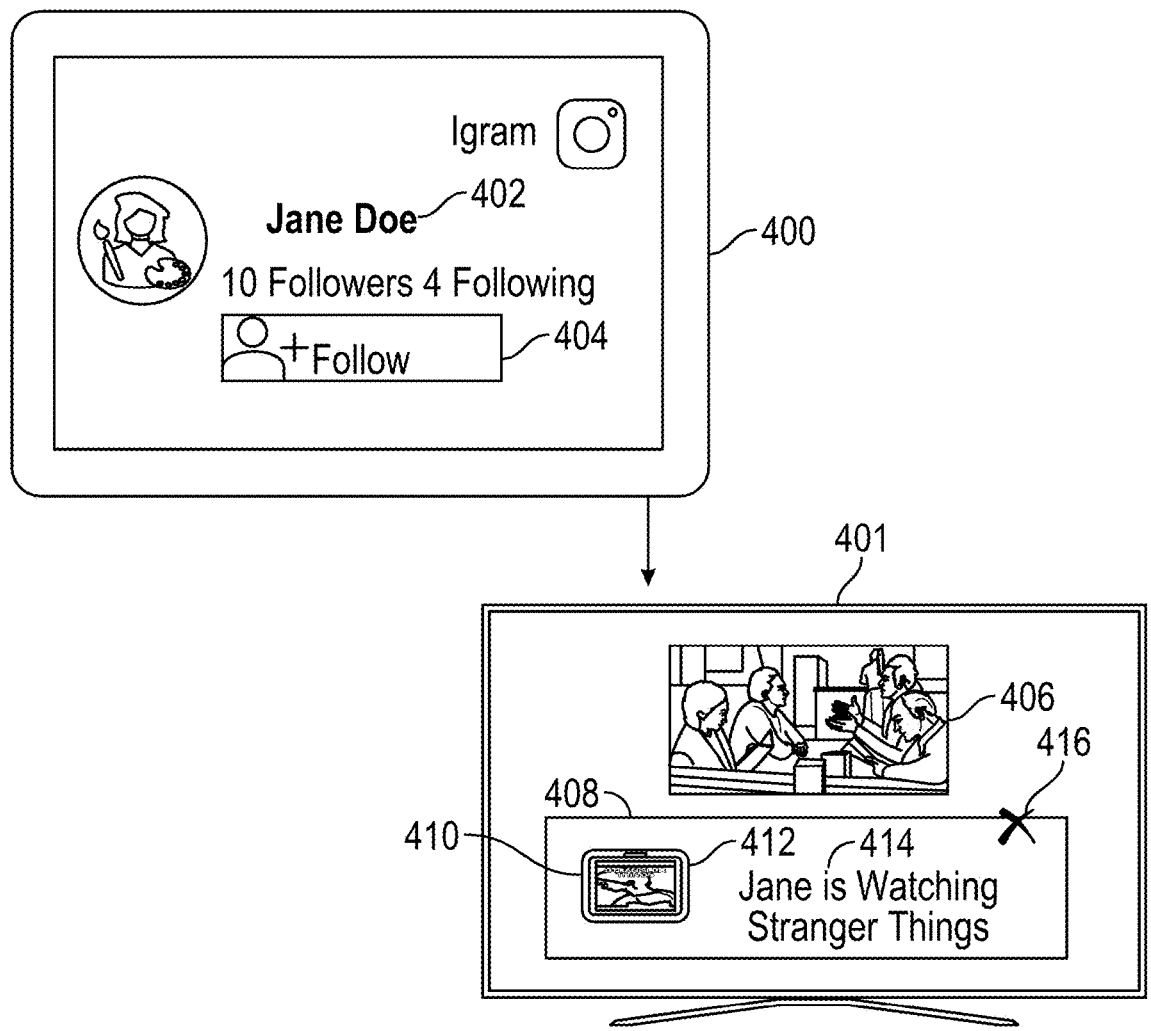
FIG. 4 shows a user interface of a media application for a shared media asset based on following a social media account provided by a media recommendation system, in accordance with some embodiments of this disclosure.

In some embodiments, at step 110, the media application determines if first device (e.g., device 104) has authorized the second device (e.g., device 108) to share a counterpart version of what is being currently consumed on the second device. The counterpart version of media is a version of the second media asset that is representative of the second media asset. In some embodiments, the media application determines the presence of the authorization by detecting that the first device (e.g., device 104) associated with the first user profile designates the second device (e.g., device 108) associated with the second user profile to share content with the first device. In some embodiments, in order to determine authorization, the media application provides devices associated with user profiles with user interface options to designate other devices associated with other user profiles to share content. The media application can check the sharing permissions of devices by cross-checking a device's IP address with the user account credentials designated by the first device. In some embodiments, a device logged into a user account receives designation to receive shared media from a device logged into a different user account. The detailed description of FIG. 4 provides example implementations of cross-account sharing authorization.

For example, a device logged into the Doe family Iflix account under Jane's profile authorizes a device logged into the Doe family Iflix account under Mom's profile to share the media consumed by the device logged into the Doe family Iflix account under Mom's profile with the device logged into the Doe family Iflix account under Jane's profile. The media application may verify this designation by cross-checking the list of designated users selected by Jane and the IP addresses of the devices associated with the user profiles of the designated users. The media application determines that the device logged into the Doe family Iflix account under Mom's profile is on Jane's profile's list of designated users.

In some embodiments, the media application synchronizes the counterpart version of the second media asset with the display of the second media asset at the second device (e.g., device 108). In some embodiments, the media application performs the synchronization by unicasting. For example, if implementing unicasting, server 100, e.g., an Iflix server, sends media asset data packets to the first device running the media application logged in with the same credentials as the second device running the media application. The media asset data packets are verified by the server and the second device via IP address tags of the second device's IP address. Time servers may be used to synchronize streaming, e.g., via matching NTP-based timecodes, of the counterpart version of the media asset and the original version of the media asset.

In some embodiments, the media application performs the synchronization by multicasting. For example, multicasting can be application layer multicast or network (IP) layer multicast. In application layer multicast, the media application is responsible for the transmission of streaming data of media assets. In network layer multicast, network infrastructure, such as routers, perform the transmission of streaming data of media assets. In both approaches, the transmission of the same streaming data occurs simultaneously or near simultaneously.

In some embodiments, the media application performs the synchronization by peer-to-peer synchronization. In such embodiments, for example, the first device and the second device are on the same local network. The second device creates a stream of portions of the second media asset and transmits the stream directly to the first device via the local network, e.g., LAN or wireless LAN. In some implementations, the second device also directly shares metadata of the second media asset with the first device.

In some embodiments, the first device receives a notification from a server, e.g., server 100, that the second device is generating for display a second media asset. The notification includes a manifest including a counterpart version of the second media asset to be displayed as an overlay over the display of the first device. In some approaches, the first device uses the data from the manifest to access network addresses listed by the manifest to receive parts of the second media asset that are to be shared. The first device may generate for display an overlay of the counterpart version of the second media asset using the parts received from the network addresses in the manifest. In some embodiments, the first device may receive a modified manifest listing only addresses of relevant portions of the second media asset that are to be shared, instead of receiving the full manifest.

In some embodiments, the counterpart version of the second media asset is offset in time from the original display of the second media asset. Rather than synchronizing the counterpart version of the second media asset with the display of the second media asset on the second device, the media application may lapse the display of the counterpart version. For example, the second device (e.g., device 108), logged into the Doe family account under Mom's profile, generates for display the second media asset "The Last of Us" at 5 pm. Later that same day, the first device, logged into the Doe family account under Jane's profile, generates for display the first media asset "All Quiet on the Western Front" at 8 pm. The first device receives a counterpart version of "The Last of Us" in an overlay over the display of "All Quiet on the Western Front," three hours after the second device generated for display "The Last of Us."

In another example, the second device (e.g., device 108), logged into the Doe family account under Mom's profile, generates for display the second media asset "The Last of Us" at 5 pm. Later that same day, the second device, logged into the Doe family account but now under Jane's profile, generates for display the first media asset "All Quiet on the Western Front" at 8 pm. The second device generates for display a counterpart version of "The Last of Us" in an overlay over the display of "All Quiet on the Western Front," three hours after the second device generated for display "The Last of Us."

In some embodiments, the counterpart version of the second media asset is a portion of the second media asset, such as the first few seconds of the second media asset. In some embodiments, the counterpart version of the second media asset is a key scene that occurs within the first few minutes of the second media asset. For example, the second device (e.g., device 108), logged into the Doe family account under Mom's profile, generates for display the second media asset "The Last of Us." In this example, the second device has already been displaying the second media asset for approximately thirty minutes. In this example, rather than share a counterpart version of the second media asset with the first device that is synchronized to the display of the second media asset at the second device, the media application generates for display a counterpart version of "The Last of Us" that is a key scene within the first eight minutes of "The Last of Us." This helps to prevent the first device from generating for display a counterpart version of media that would be a spoiler.

In some embodiments, the counterpart version of the second media asset is a static image representing the second media asset. The static image may be of an I-frame of the second media asset. The static image may be a cover art or thumbnail of the second media asset. For example, the media application receives a JPEG file representing the second media asset at the first device (e.g., device 104) running the media application and generating for display the first media asset.

Figure 11:
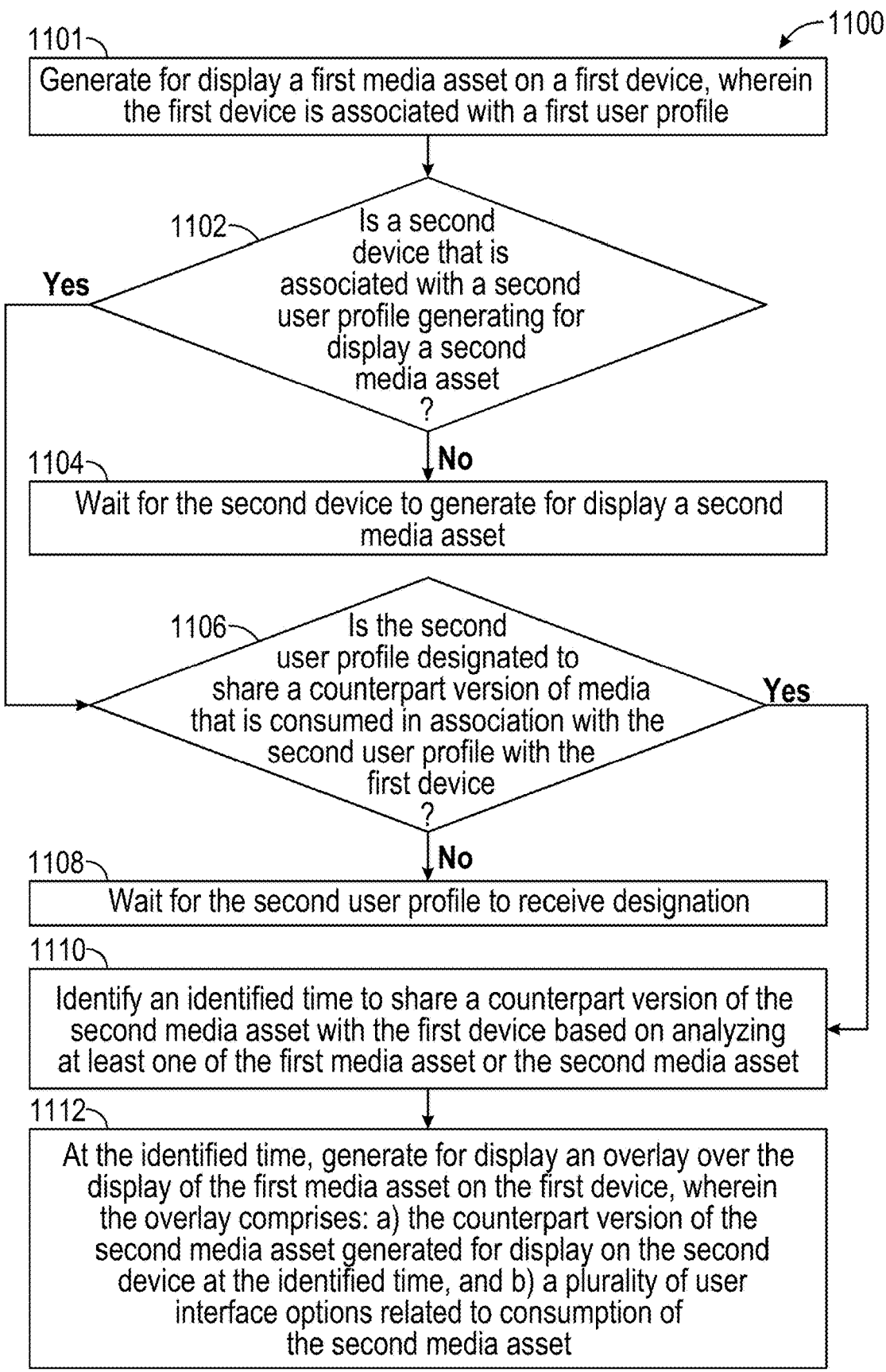
FIG. 11 is a flowchart of an illustrative process for sharing a counterpart version of a media asset from one device with another device, in accordance with some embodiments of this disclosure.

Once the media application determines that the first device (e.g., device 104) has authorized the second device (e.g., device 108) to share what is being currently consumed, the media application identifies, at step 112, a time to share a counterpart version of the second media asset with the first device (e.g., device 104). The media application, at step 1010, identifies a time based on analyzing at least one of the first media asset or the second media asset. In some embodiments, the media application analyzes the I-frame rates of the first media asset and the second media asset. FIG. 11 provides example implementations of I-frame analysis as a basis of identifying a time to share media. In such embodiments, the media application looks for a time when the first media asset has an I-frame rate below a threshold rate and the second media asset has an I-frame rate above a threshold rate. For example, the media application identifies a time when "All Quiet on the Western Front" is high-paced and action-packed and "The Last of Us" is slow-paced and relaxed.

In another embodiment, the media application determines that the first device associated with the first user profile is displaying the slow-paced scene by analyzing displayed scenes with a trained AI model. In some embodiments, the AI model finds scenes with many changes, e.g., camera angle changes, high frame rates, and scenes without many changes. Such embodiments are useful in the case of VBR or constant bit rate (CBR) streaming. In some embodiments, the media application determines that the first media asset displayed by the first device associated with the first user profile does not have an audio component at a particular time while the second media asset does have an audio component. The audio component may be determined by the media application analyzing the first media asset's and the second media asset's subtitle data or audio payload data. In some approaches, the media application determines a particular time when the first media asset displayed by the first device associated with the first user profile does not include dialogue while the second media asset does include dialogue. In such embodiments, the particular time is selected to be the identified time.

In some embodiments, the media application identifies a time within the second media asset based on metadata of the second media asset matching data of the first user profile. For example, the media application identifies that Jane, based on Jane's user profile data, enjoys content featuring actor Pedro Pascal. The media application also identifies a scene in the second media asset, "The Last of Us," being played by Mom's device associated with Mom's user profile, that has many close-ups of Pedro Pascal. The scene in, e.g., "The Last of Us," is not necessarily the scene that is currently displayed by Mom's device associated with Mom's user profile. For example, Mom's device associated with Mom's user profile is currently displaying a scene 30 minutes into "The Last of Us," but a scene with close ups of Pedro Pascal occurs 45 minutes into "The Last of Us." Thus, the media application shares a counterpart version of "The Last of Us" at the 45 minute mark with Jane's device associated with Jane's user profile. In some embodiments, the second media asset is played by Mom's device associated with Mom's user profile at a time before Jane's device associated with Jane's user profile plays a first media asset. For example, Mom watched "The Last of Us" at 1 pm but Jane is watching a different media asset at 6 pm. Thus, the media application identifies the time when "The Last of Us" has many close-ups of Pedro Pascal to share the counterpart version of "The Last of Us" with Jane's device.

The media application, at step 114, instructs the server 116 to generate for display an overlay comprising the counterpart version of the second media asset over the display of the first media asset on the first device (e.g., device 104). In some embodiments, server 116 is the original server (e.g., server 100). In some embodiments, server 116 is a different server than server 100. Server 100 and server 116 could be different due to one server having a high volume of requests or being overloaded. Server 100 and server 116 could be different due to one service having multiple regional servers. In some embodiments, server 100 and server 116 are communicatively coupled.

The server 116 sends the streaming data of the second media asset to the first device (e.g., device 104). For example, a server sends the data of "The Last of Us" to Jane's device. The media application, at step 118, modifies the display of the first device to include the counterpart version of the second media asset. In some embodiments, the media application generates for display an overlay over the display of the first media asset. The overlay comprises the counterpart version of the second media asset and a plurality of user interface options related to consumption of the second media asset. For example, the media application generates for display an overlay banner comprising a picture-in-picture (PIP) window of a synchronized version of "The Last of Us" along with user interface options. The media application modifies the display of "All Quiet on the Western Front" on Jane's device to include the overlay.

In some embodiments, the counterpart version of the second media asset in the overlay is inserted using HLS, MPEG-DASH, RTMP, WebRTC, any other suitable streaming protocol or any combination thereof. The media application may generate the counterpart version of the second media asset using a different streaming protocol than the first media asset. In some embodiments, the static sections of the overlay, e.g., the user interface options and second media asset description, are .css files, .png files, js files, .txt files, .html files, any other suitable file format or any combination thereof.

Figure 7:
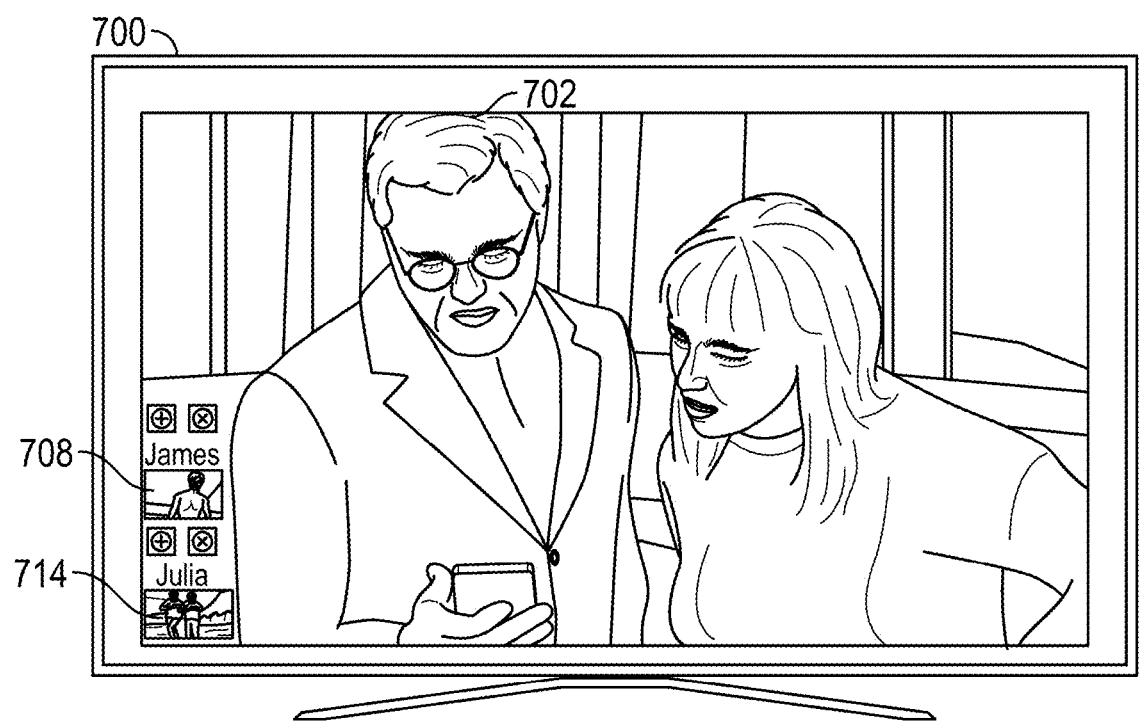
FIG. 7 shows a user interface of a media application for multiple shared content windows provided by a media recommendation system, in accordance with some embodiments of this disclosure.

In some embodiments, the user interface options include options to add the second media asset to a watchlist, queue the second media asset, dismiss the overlay, and switch the display of the first device to the second media asset. The media application adds the second media asset to a watch list by requesting the streaming data of the second media asset at the first device from, e.g., server 116. Once the first device running the media application has received the streaming data of the second media asset, the media application stores the streaming data in a watch list for the first user device to generate for display at a later time. The first device may select a media asset from the watch list by selecting a user interface option. In some embodiments, the overlay comprises a plurality of PIP windows displaying a plurality of shared media assets. FIG. 7 provides example implementations of an overlay comprising counterpart versions of multiple media assets.

Figure 5:
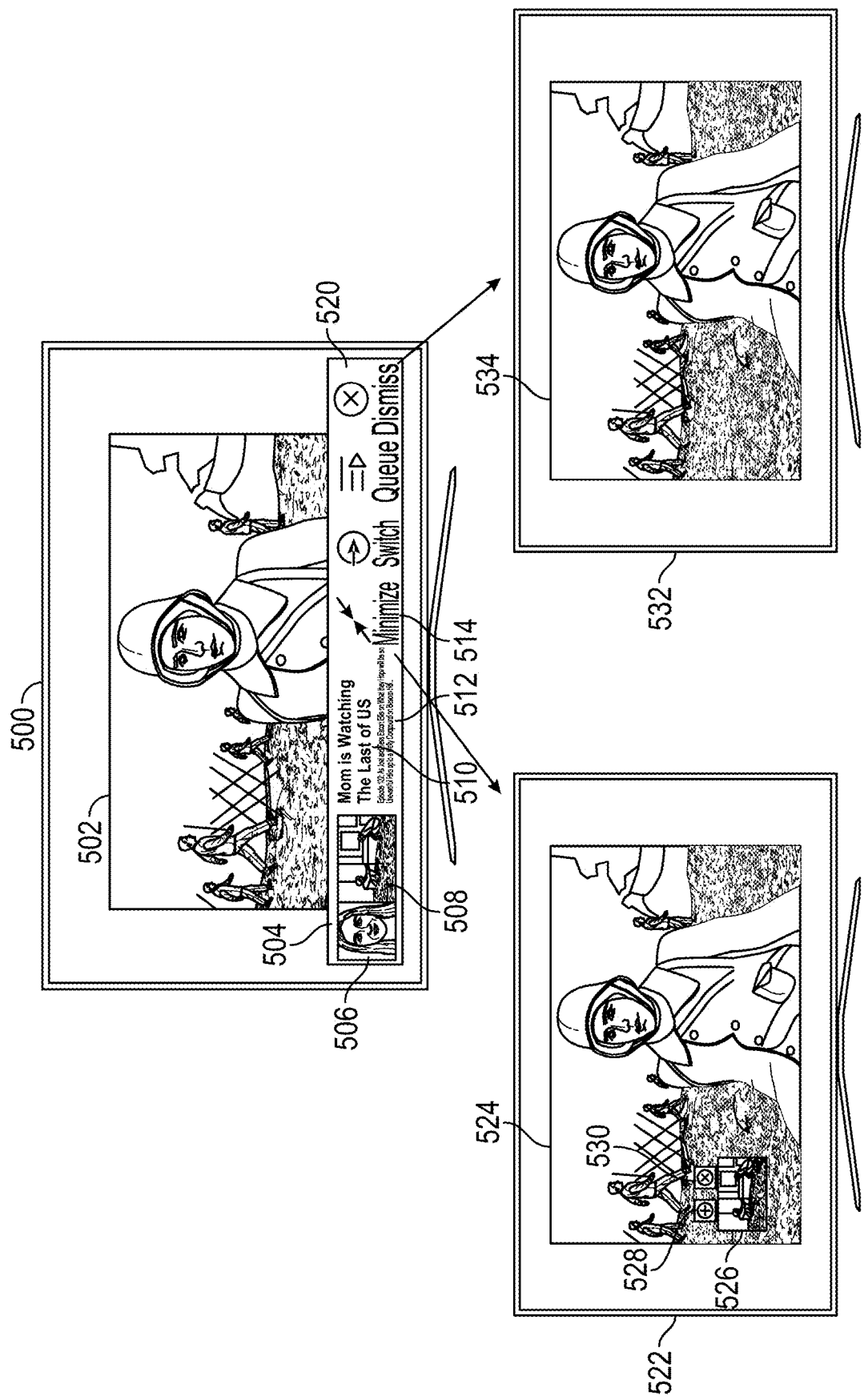
FIG. 5 shows a user interface of a media application for user interface options for minimizing or terminating the display of a picture-in-picture window provided by a media recommendation system, in accordance with some embodiments of this disclosure.

In some embodiments, the media application adds the second media asset to the queue of the first device's stream by adding the streaming data of the second media asset to a First in First Out (FIFO) data structure. In some embodiments, the first device has gone through all the streaming data of the first media asset and the next streaming data in the data structure is the streaming data of the second media asset. For example, Jane wants to finish "All Quiet on the Western Front" but wants to watch "The Last of Us" after. Jane selects the user interface option of "Add to Queue" for "The Last of Us." Once "All Quiet on the Western Front" ends, "The Last of Us" begins streaming. In another embodiment, the first device has gone through all the streaming data of the first media asset, and there is intermediate streaming data that has been queued before the second media asset was queued. For example, Jane wants to finish "All Quiet on the Western Front" but wants to watch "The Last of Us" after. However, Jane also wanted to watch "Seinfeld" and queued it before selecting the user interface option of "Add to Queue" for "The Last of Us." Therefore, once "All Quiet on the Western Front" ends, and the intermediary media asset "Seinfeld" ends, "The Last of Us" begins streaming. FIG. 5 provides example implementations of the media application receiving a user interface input to dismiss the overlay.

In some embodiments, the media application switches the display of the first media asset at the first device to display the second media asset at the first device. For example, the media application running on the first device (e.g., device 104) receives a user interface selection of "Switch," so the media application terminates the stream of "All Quiet on the Western Front" and begins streaming "The Last of Us" in the main window of the display of the device. The media application then receives the streaming data of the second media asset from, e.g., server 116, and generates for display the streaming data of the second media asset in the main window of the first device. During this process, the media application may terminate the display of the overlay while switching the stream of the second media asset data from a PIP window to the main display window.

In some embodiments, the media application generates for display the overlay as a banner over the display of the first media asset on the first device. In some embodiments, the overlay includes a description of the second media asset. For example, user interface 120 displayed on the first device shows an overlay banner including a description of the second media asset, "The Last of Us." The media application identifies the description of the second media asset from the data of the second media asset.

At user interface 120, the media application generates for display at the first device the first media asset and the overlay including the counterpart version of the second media asset and the user interface options. For example, Jane's device displays "All Quiet on the Western Front" in the main display window, and the overlay of "The Last of Us" in a smaller window at the bottom of the display. In some embodiments, the media application generates for display the overlay in a display window. In other embodiments, the media application generates for display the content of the overlay directly over the media asset. In other approaches, the overlay is over a portion of the display of the first media asset. In some embodiments, the main display of the first media asset on the first device temporarily decreases in size while the counterpart version of the second media asset is displayed in a window adjacent to the main display window. In some embodiments, the overlay displays a description of who is watching the second media asset. For example, at user interface 120, the media application displays in the overlay the text "Mom is watching The Last of Us."

Figure 2A:
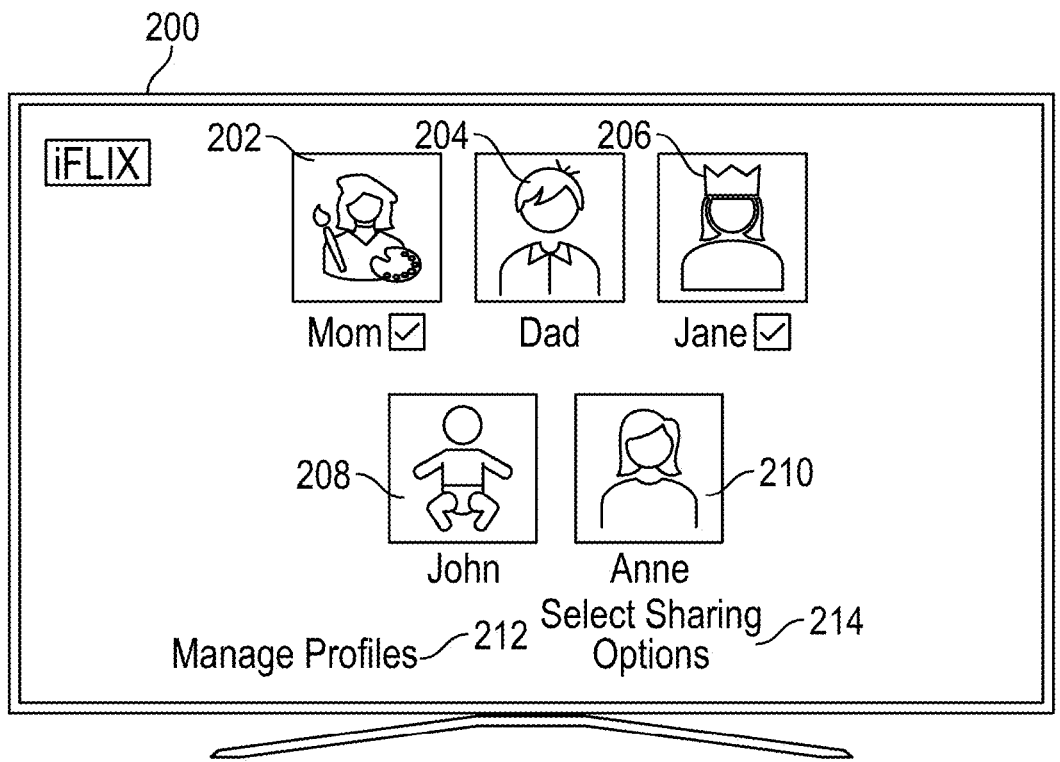
FIG. 2A shows a user interface of a media application for a user account with multiple profiles provided by a media recommendation system, in accordance with some embodiments of this disclosure.

FIG. 2A depicts an example user interface 200 of a media application (e.g., media application of Iflix media provider, as described above in connection with FIG. 1). For example, user interface 200 may display an identifiers of user account showing identifiers of multiple profiles provided by a media application running on a Media Recommendation System (e.g., MRS described in relation to FIG. 1), in accordance with some embodiments of this disclosure. In some embodiments, user interface 200 is displayed in response to the media application receiving a user interface selection to log in to a streaming service account (e.g., an Iflix user account). In some embodiments, the user account, e.g., for an Iflix account, comprises multiple user profiles. For example, the user interface 200 comprises identifiers for five user profile identifiers 202, 204, 206, 208, and 210. User profile identifiers 202 and 206 include verification symbols. In some embodiments, verification symbols accompany the identifiers 202-210 for the user profiles. Verification symbols may indicate that a device running the media application and signed into the user account credentials under a user profile has been designated to share watch histories with the same device running the media application and signed into the user account credentials under a different user profile. In some embodiments, verification symbols indicate that a device running the media application and signed into the user account credentials under a user profile has been designated to share watch histories with a different device signed into the user account credentials under a different user profile.

For example, the user profile identifiers 202 and 206 indicate that the media application allows media sharing between Mom's user profile and Jane's user profile. In some embodiments, user interface option 212, when selected at a user interface, allows user devices to access and manage user profiles within the user account that the device is signed into. In some embodiments, managing user profiles comprises designating sharing media amongst user profiles, deleting user profiles, adding user profiles, and selecting user profile identifiers. In some embodiments, the media application generates for display a user interface option (e.g., user interface option 214) for selecting media sharing options. In some embodiments, in response to receiving a user interface selection of user interface option 214, the media application modifies user interface 200 to user interface 250, as described below in connection with FIG. 2B.

Figure 2B:
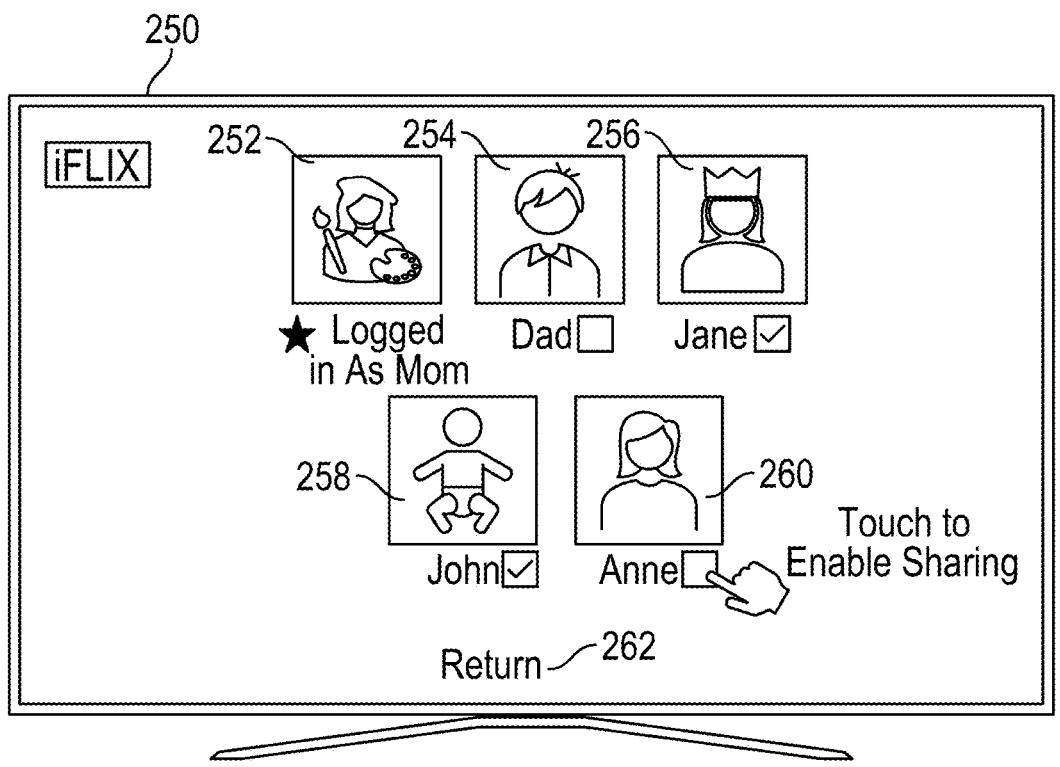
FIG. 2B shows a user interface of a media application for user interface options for designating media sharing among user profiles of a user account.

FIG. 2B depicts an example user interface 250 of a media application (e.g., media application of Iflix media provider, as described above in connection with FIG. 1). For example, Iflix generates for display user interface 250 which displays user profile identifiers 252-260 and user interface option 262 for designating media sharing among user profiles provided by a media application running on a Media Recommendation System (e.g., MRS described in relation to FIG. 1), in accordance with some embodiments of this disclosure. In some embodiments, the media application is logged into a user account under a user profile (e.g., user interface 250 shows at user profile identifier 252 that Iflix is logged in under Mom's user profile).

In some embodiments, user profile identifiers include verification symbols that indicate whether a device logged into a user profile is designated to share media with other devices signed into other user profiles. For example, user profile identifiers 254-260 include checkboxes, some of which contain checkmarks. In some embodiments, in response to the media application receiving a user interface selection of a verification symbol (e.g., a user interface selection of the checkbox at user profile identifier 260), the media application allows media sharing to and/or from the user profile associated with the selected verification symbol. For example, in response to Iflix receiving a user interface selection from the device signed into Mom's user profile (e.g., as indicated by the identifier at user profile identifier 252) of the checkbox at user profile identifier 260, Iflix designates devices signed into Anne's user profile to share media with devices signed into other designated profiles. In some embodiments, the media application generates for display a user interface option (e.g., user interface option 262) to return to the user interface 200, which is described above in connection with FIG. 2A.

Figure 3:
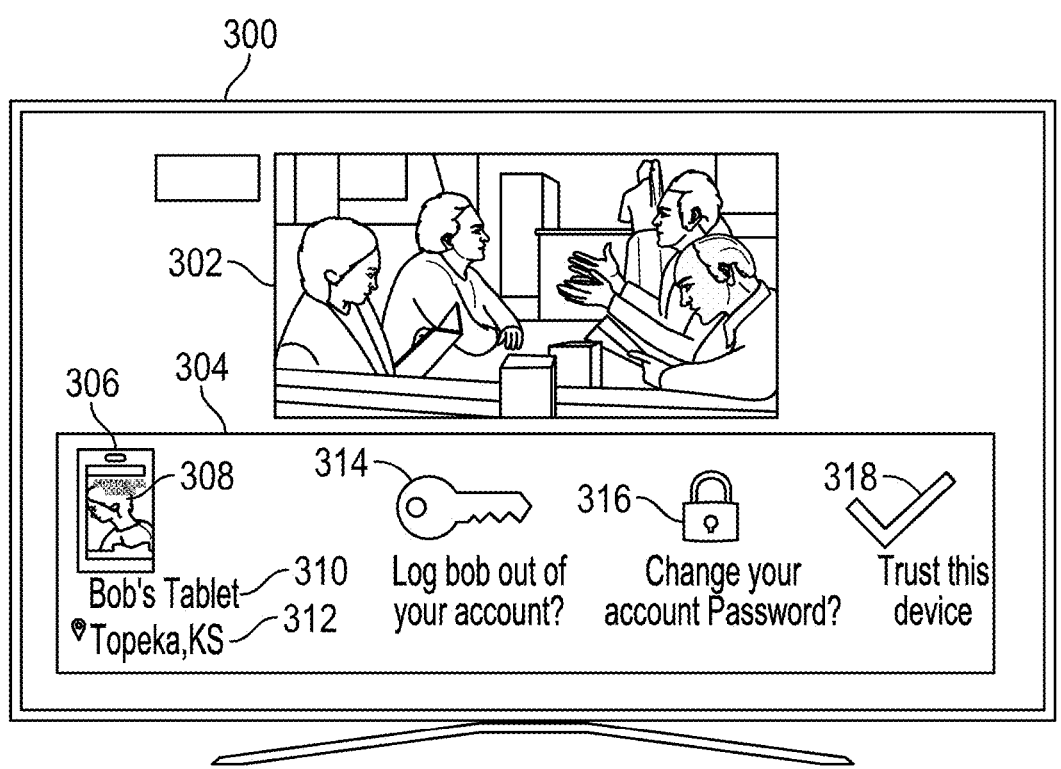
FIG. 3 shows a user interface of a media application for user interface options at a user device based on another device's geographical location provided by a media recommendation system, in accordance with some embodiments of this disclosure.

FIG. 3 depicts an example user interface 300 of a media application (e.g., media application of Iflix media provider, as described above in connection with FIG. 1). For example, user interface 300 may display an identifier of another device's geographical location and user interface options provided by a media application running on a Media Recommendation System (e.g., MRS described in relation to FIG. 1), in accordance with some embodiments of this disclosure. User interface 300 is a variant of user interface 120 described in connection with FIG. 1. In some embodiments, the media application generates for display overlay 304 when it detects that a device logged into a designated user profile is in an unfamiliar location. The media application detects the location of a device via the device's GPS geolocation, IP address, VPN connection, any other suitable location detecting means or any combination thereof.

While generating for display a media asset 302, e.g., via the methods described in connection with FIG. 1, the media application generates for display an overlay 304 over part of the display of the device running the media application. Overlay 304 comprises a shared media asset from another device running the media application signed in with the same user account credentials. For example, a device called "Bob's Tablet" is signed into the same user account as the device displaying the overlay 304.

At 306, a visual representation of a tablet displaying media asset 308 is displayed at user interface 300. In some embodiments, the counterpart version of the second media asset is displayed within a visual depiction of the type of device it is currently being generated for display at. For example, a tablet device called "Bob's Tablet" (e.g., depiction 310) is signed into the same user account as the device displaying the overlay and is currently generating for display the media asset "Stranger Things," as shown at 306 and 308. In some embodiments, the geographic location of the sharing device is generated for display. For example, geographic location 312 shows within overlay 304 that Bob's Tablet is currently located in Topeka, KS. The media application determines that the geographic location is unfamiliar by cross-referencing past geographic location data of devices previously logged into the user account under the user profile with the current geographic location data. If the past geographic location data does not match the current geographic location data, the media application determines that the device might pose a security risk to the user account.

In some embodiments, the media application generates for display user interface option 314. User interface option 314 provides an option to the device running the media application signed in with user account credentials to log out the device sharing the counterpart version of the media asset 308. The media application detects that the geographic location, e.g., Topeka, KS 312, is not a typical geographic location for a device signed into the user account. Thus, the media application provides user interface option 314 to allow greater security of the user account. In some embodiments, the media application always displays the geographic location of the device sharing the counterpart version of a second media asset. In some embodiments, the media application only displays the geographic location of the device sharing the counterpart version of a second media asset if the media application detects that the geographic location is unfamiliar.

Additionally, the media application generates for display user interface option 316, which provides an option to the device running the media application signed in with user account credentials to change the user account password. User interface option 316 provides greater security of the user account. Greater security is provided by user interface option 316 because it both prohibits the unwelcomed user in the unfamiliar geographic location (e.g., Topeka, KS) from continuing streaming media using the user account and prohibits the unwelcomed user from sharing the user account password to other potentially unwelcomed users.

The media application generates for display a user interface option (e.g., user interface option 318) to trust the device signed into the user profile in the unfamiliar geographic location. In some embodiments, the device logged into the user account in a new geographic location is a trusted device of the user account. For example, the device running the media application logged into the user account displaying media asset 302 receives a selection of user interface option 320 (e.g., Trust this Device) when the user associated with the user profile generating for display media asset 302 knows that a member of the user account is on a trip to Topeka, KS. The new geographic location does not pose a security threat, thus the media application receives the selection of user interface option 318 to trust device 306 and terminate the overlay 304 and allow device 306 to continue streaming media asset 308.

FIG. 4 depicts example user interfaces 400 and 401 of a media application (e.g., media application of Iflix media provider, as described above in connection with FIG. 1). For example, user interfaces 400 and 401 may provide media sharing options for social media followers provided by a media application running on a Media Recommendation System (e.g., MRS described in relation to FIG. 1), in accordance with some embodiments of this disclosure. User interface 400 depicts a social media account, e.g., an Igram account, for a user named Jane Doe. A social media application, e.g., Igram, receives a user interface selection of a user interface option to follow a user account, e.g., user interface option 404. For example, the tablet generating for display user interface 400 receives a selection of the "Follow" option 404 from a user associated with the device generating for display user interface 401. In some embodiments, the media application running the MRS accesses data from the social media application. For example, the media application generates for display a user interface option asking whether to allow the media application access to the social media application data.

In some embodiments, in response to the social media application receiving the "Follow" request at user interface option 404, the media application accesses data from the social media application. For example, an Iflix server accesses data from an Igram server. For example, Igram receives a follow request for Jane Doe from a device signed into a user account with credentials different than Jane Doe. The media application generates for display overlay 408 at user interface 401, which is generated for display by the media application logged in to a user account with Jack's credentials. By the social media application (e.g., Igram) receiving the user interface selection to "Follow" the Jane Doe user profile, the social media application grants the media application logged in with Jack's credentials access to the watch history of the user account with Jane Doe's credentials.

Overlay 408 shows a counterpart version of a media asset 412, consumed originally by device 410, consumed by a device running the media application signed in with Jane Doe's credentials. In some embodiments, a description (e.g., description 414, "Jane is watching Stranger Things") notifies a user associated with the device signed into a user account that Jane is watching a media asset (e.g., "Stranger Things"). For example, after Jack follows Jane on Igram, Jack receives notifications, at the device running Iflix under his credentials, of the media assets consumed by Jane at another device running Iflix under her credentials. In some embodiments, overlay 408 comprises a visual depiction of the device currently consuming media asset 412. For example, Jane is watching media asset 412 using a tablet (e.g., device 410).

FIG. 5 depicts example user interfaces 502, 524, and 534 of a media application (e.g., media application of Iflix media provider, as described above in connection with FIG. 1). For example, user interfaces 502, 524, and 534 may provide user interface options for customizing an overlay display provided by a media application running on a Media Recommendation System (e.g., MRS described in relation to FIG. 1), in accordance with some embodiments of this disclosure. A device (e.g., device 500) running the media application generates for display a first media asset and an overlay (e.g., overlay 504) over a bottom portion of the first media asset. In some embodiments, overlay 504 comprises a counterpart version of a second media asset consumed by a different device signed into a user account of the media application with the same credentials as device 500. In some embodiments, overlay 504 comprises a user profile identifier 506 representing the user profile under the user account that is consuming the second media asset. For example, the user profile for "Mom" has user profile identifier 506 next to the counterpart version of the second media asset 508. In some embodiments, overlay 504 comprises a description of the second media asset and a description of who is watching the second media asset. For example, overlay 504 shows that "Mom is watching The Last of Us" and a description of the episode of "The Last of Us" shared with device 500.

In some embodiments, overlay 504 comprises a user interface option 514 to minimize overlay 504. Upon receiving a user interface selection of user interface option 514, the media application modifies user interface 502 to user interface 524. The media application generates for display at device 522 user interface 524 which comprises the first media asset and a minimized overlay 526. In some embodiments, device 500 is the same device as device 522. Minimized overlay 526 comprises the counterpart version of the second media asset in a PIP window. For example, overlay 526 comprises a PIP window in the bottom left corner of user interface 524. In some embodiments, the minimized overlay 526 comprises user interface options 528 and 530, which provide options to add the second media asset to a watch list or terminate display of the minimized overlay 526, respectively.

In some embodiments, overlay 504 comprises a user interface option 514 to terminate display of overlay 504. Upon receiving a user interface selection of user interface option 520, the media application modifies user interface 502 to user interface 534. In some embodiments, device 500 is the same device as device 532. User interface 534 comprises only display of the first media asset. The media application terminates generating for display overlay 504 in response to receiving a user interface selection of user interface option 520.

Figure 6:
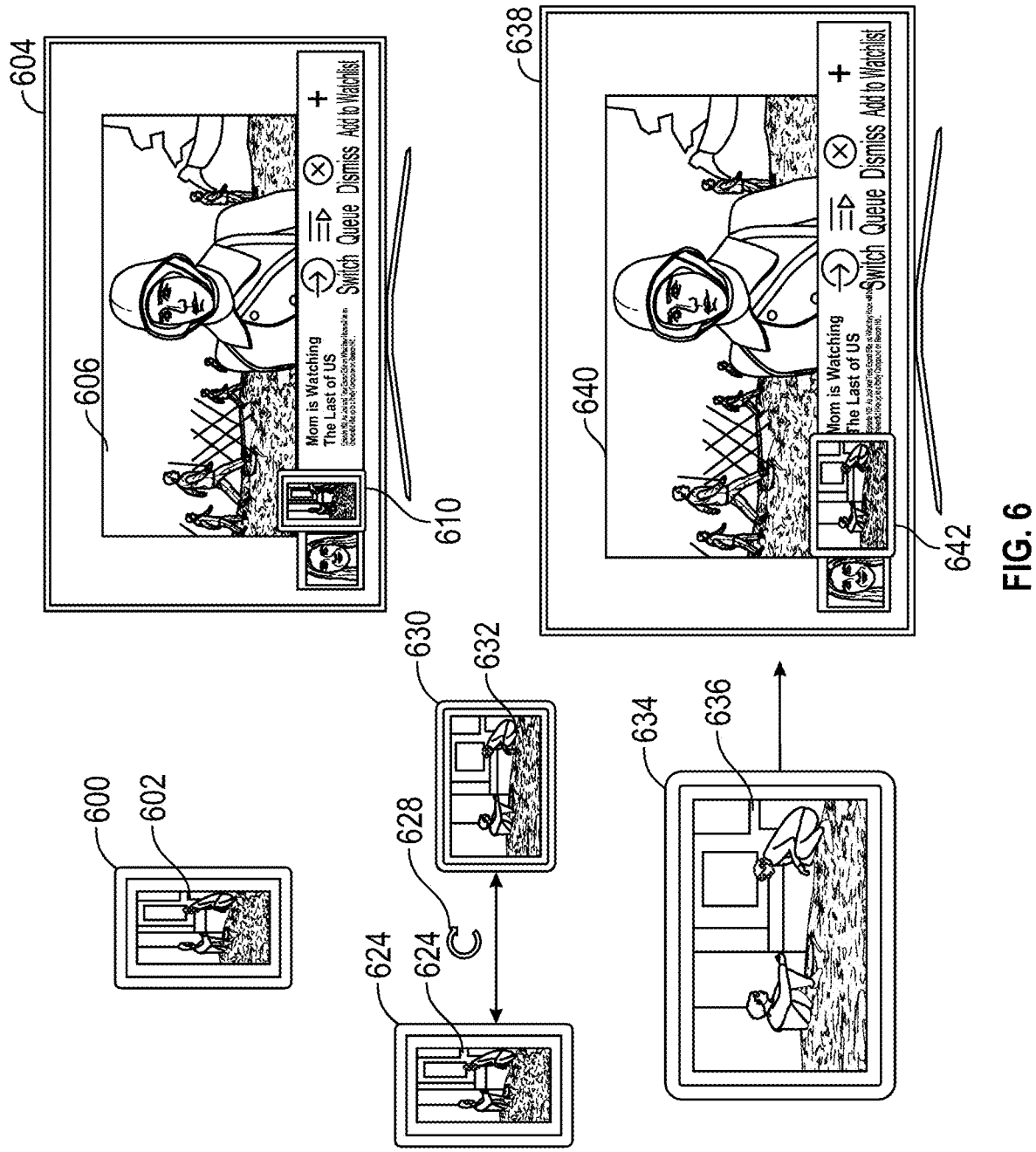
FIG. 6 shows a user interface of a media application for displaying shared content in the orientation that the origin device displays the shared content provided by a media recommendation system, in accordance with some embodiments of this disclosure.

FIG. 6 depicts example user interfaces of a media application (e.g., media application of Iflix media provider, as described above in connection with FIG. 1). For example, user interfaces 606 and 640 may display counterpart version of media in an orientation that matches the orientation of the device generating for display the media provided by a media application running on a Media Recommendation System (e.g., MRS described in relation to FIG. 1), in accordance with some embodiments of this disclosure. In some embodiments, the media application rotates the orientation of the media asset the media application is generating for display. For example, when tablet 624 is vertically oriented, the media application generates for display media asset 626 vertically. In this example, tablet 624 rotates at step 628 from a vertical orientation to a horizontal orientation. In another example, tablet 624 rotates from a horizontal orientation to a vertical orientation. In this example, when tablet 630 is horizontally oriented, the media application generates for display media asset 632 horizontally.

In some embodiments, device 604 receives orientation data of device 600 sharing the counterpart version of the second media asset. For example, the media application running on device 604 receives streaming data for media asset 610 as well as orientation data of device 600. Based on the streaming data for media asset 610 and the orientation data of device 600, the media application generates for display the counterpart version of media asset 602 along with a visual depiction of the device 600 together in a vertical orientation of media asset 610 at user interface 606.

In another example, the media application running on device 638 receives streaming data for media asset 636 as well as orientation data of device 634. Based on the streaming data for media asset 636 and the orientation data of device 634, the media application generates for display the counterpart version of media asset 636 along with a visual depiction of the device 634 together in a horizontal orientation 642 at user interface 640.

In another embodiment, the media application running on a device, e.g., device 638, detects an orientation of the second device, e.g., device 624 during consumption of the second media asset. In response to the detecting, the media application running on, e.g., device 638 generates for display a PIP display of the counterpart version of the second media asset in the orientation of device 638 (e.g., horizontally). In such embodiments, the media application running on, e.g., device 638, shares a counterpart version of the second media asset in an orientation that better suits the display of device 638.

FIG. 7 depicts an example user interface 702 of a media application (e.g., media application of Iflix media provider, as described above in connection with FIG. 1). For example, user interface 702 may generate for display multiple shared media assets provided by a media application running on a Media Recommendation System (e.g., MRS described in relation to FIG. 1), in accordance with some embodiments of this disclosure. The media application running on device 700 generates for display user interface 702. In some embodiments, user interface 702 comprises a first media asset and an overlay comprising multiple counterpart versions of other media assets. For example, user interface 702 comprises a counterpart version of media asset 708 and a counterpart version of media asset 714. In this example, the counterpart versions of media assets 708 and 714 are generated for display as PIP windows in the lower left corner of the display of device 700. Above the counterpart versions of media assets 708 and 714 are the names of the user profiles which are generating for display media assets 708 and 714.

In some embodiments, the media application running on device 700 receives streaming data for media asset 708 and 714 from two different devices running the media application simultaneously. For example, James watches a media asset on a smartphone running the media application and Julia watches a media asset on a laptop running the media application at the same time. In some embodiments, the media application running on device 700 receives streaming data for media asset 708 and 714 from the same device. In such approaches, media asset 708 was generated for display at a device at a first time, and media asset 714 was generated for display at the same device at a second time different than the first time. For example, James watches a media asset on a television running the media application in the morning and Julia watches a media asset on the television running the media application in the evening.

Figure 8:
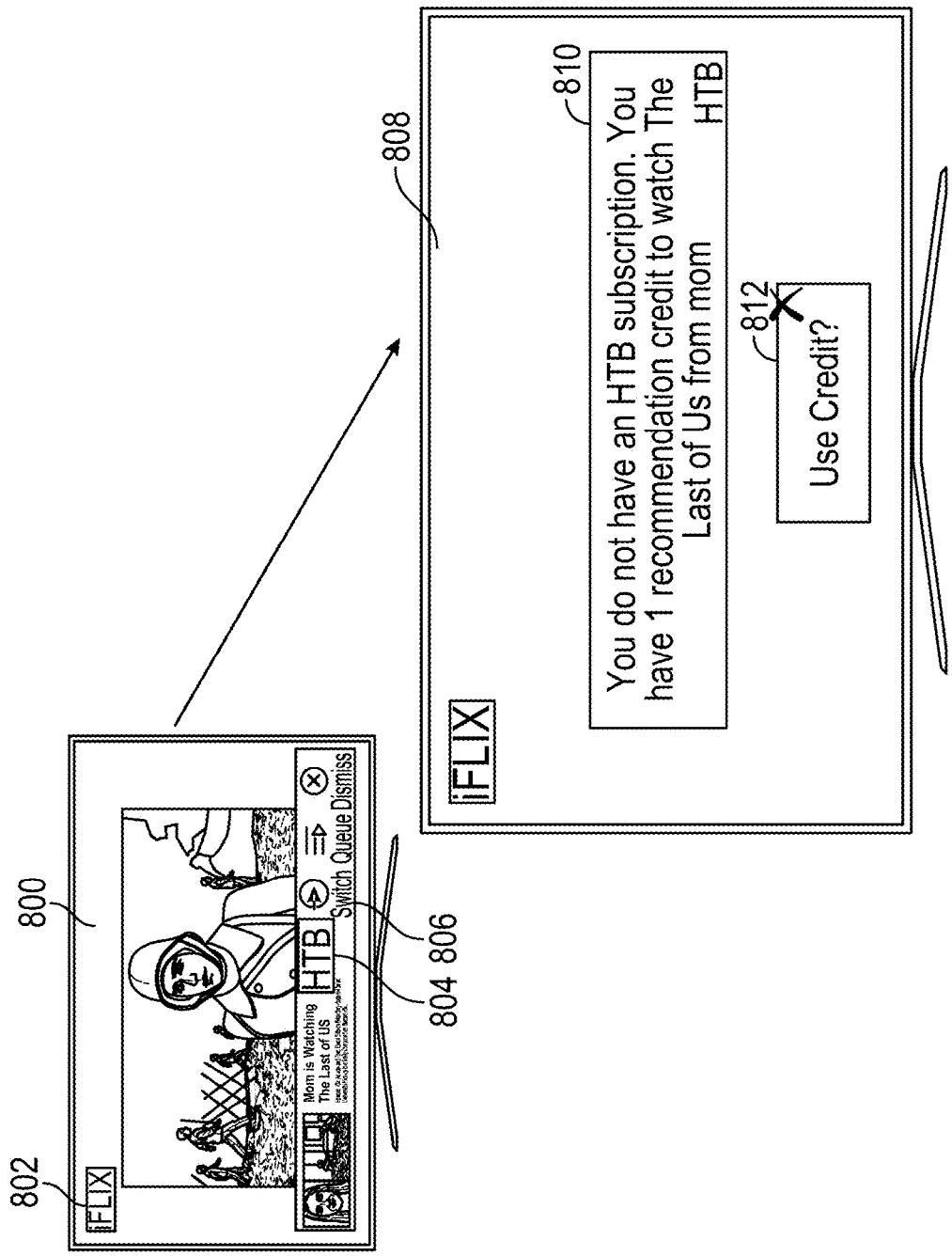
FIG. 8 shows a user interface of a media application with a user interface option relating to a recommendation credit for a streaming service provided by a media recommendation system, in accordance with some embodiments of this disclosure.

FIG. 8 depicts example user interfaces 800 and 808 of a media application (e.g., media application of Iflix media provider, as described above in connection with FIG. 1). For example, user interfaces 800 and 808 may generate for display identifiers for cross-platform recommendation credits provided by a media application running on a Media Recommendation System (e.g., MRS described in relation to FIG. 1), in accordance with some embodiments of this disclosure. A device running the media application generates for display user interface 800 while logged into a streaming service 802, e.g., Iflix, user account under a user profile. The media application generates for display an overlay comprising a counterpart version of a media asset, a description of the media asset, a streaming service 804 that the shared media asset comes from, and user interface option 806. Streaming service 802 is different than streaming service 804. For example, server 116 (e.g., an Iflix server) receives streaming data of a media asset from HTB (Home Ticket Booth). In some embodiments, streaming service 802 and/or streaming service 804 are subscription-based.

In some embodiments, streaming service 802 and streaming service 804 use the same format of manifest which allows the sharing of a counterpart of a media asset as if the first media asset and the second media asset are available from a same service. In some embodiments, streaming service 802 and streaming service 804 communicate by implementing a tool that translates the manifest of one streaming service to a format of a manifest suitable for the second streaming service. In some embodiments, streaming service 802 and streaming service 804 may provide APIs with each other that allow one streaming service to stream parts of a media asset from another service as an overlay, e.g., as shown in FIG. 1, 3-8. For example, HTB service may offer an API that allows sharing of 5% of a media asset for streaming via a media application of the Iflix service.

In response to receiving a user interface selection of user interface option 806, the device running the media application generates for display user interface 808. In some embodiments, user interface 808 comprises overlay 810 and user interface option 812. In some embodiments, the media application determines that the user credentials used to sign into the streaming service 802 account do not have an existing streaming service 804 account. In some embodiments, the media application detects that the device the media application is running on is not currently signed into a streaming service 804 account. For example, the media application determines that the device logged into a streaming service 802 account (e.g., Iflix account) generating for display user interface 800 is not associated with an existing streaming service 804 account (e.g., HTB account).

In response to determining the device logged into streaming service 802 does not have a subscription to streaming service 804, the media application generates for display overlay 810 comprising a description of a recommendation credit for streaming service 804. For example, the media application determines that the device generating for display user interface 808 does not have an existing HTB (e.g., streaming service 804) account, thus the media application offers a recommendation credit to watch the shared media. For example, Jane is watching Iflix via user interface 800 while Mom watches "The Last of Us" on HTB. The media application shares the counterpart version of "The Last of Us" with the device logged into the user account with Jane's profile. Since Jane cannot watch "The Last of Us" without an HTB subscription or an HTB recommendation credit, the media application provides a recommendation credit.

User interface option 812 provides the device generating for display user interface 808 with a credit to use subscription streaming service 804 without a subscription to watch a recommended media asset. For example, user interface option 812 displays "Use credit?" at user interface 808. In some embodiments, in response to the device running the media application receiving a user interface selection of user interface option 812, the media application generates for display the shared media asset via streaming service 804.

FIGS. 9-10 describe illustrative devices, systems, servers, and related hardware for providing audio from a live event to a user, in accordance with some embodiments of the present disclosure. FIG. 9 shows generalized embodiments of illustrative user equipment 900 and 901, which may correspond to user equipment (e.g., device 104 and device 108 of FIG. 1); user equipment (e.g., device 500 of FIG. 5). For example, user equipment 900 may be a smartphone device, a tablet, a near-eye display device, an XR device, or any other suitable device capable of participating in a XR environment, e.g., locally or over a communication network. In another example, user equipment 901 may be a user television equipment system or device. User equipment 901 may include set-top box 915. Set-top box 915 may be communicatively connected to microphone 916, audio output equipment (e.g., speaker or headphones 914), and display 912. In some embodiments, microphone 916 may receive audio corresponding to a voice of a video conference participant and/or ambient audio data during a video conference. In some embodiments, display 912 may be a television display or a computer display. In some embodiments, set-top box 915 may be communicatively connected to user input interface 910. In some embodiments, user input interface 910 may be a remote-control device. Set-top box 915 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of user equipment are discussed below in connection with FIG. 10. In some embodiments, device 900 may comprise any suitable number of sensors (e.g., gyroscope or gyrometer, or accelerometer, etc.), and/or a GPS module (e.g., in communication with one or more servers and/or cell towers and/or satellites) to ascertain a location of device 900. In some embodiments, device 900 comprises a rechargeable battery that is configured to provide power to the components of the device.

Each one of user equipment 900 and user equipment 901 may receive content and data via input/output (I/O) path 902. I/O path 902 may provide content (e.g., broadcast programming, on-demand programming, internet content, content available over a local area network (LAN) or wide area network (WAN), and/or other content) and data to control circuitry 904, which may comprise processing circuitry 907 and storage 908. Control circuitry 904 may be used to send and receive commands, requests, and other suitable data using I/O path 902, which may comprise I/O circuitry. I/O path 902 may connect control circuitry 904 to one or more communications paths (described below). I/O functions may be provided by one or more of these communications paths but are shown as a single path in FIG. 9 to avoid overcomplicating the drawing. While set-top box 915 is shown in FIG. 9 for illustration, any suitable computing device having processing circuitry, control circuitry, and storage may be used in accordance with the present disclosure. For example, set-top box 915 may be replaced by, or complemented by, a personal computer (e.g., a notebook, a laptop, a desktop), a smartphone (e.g., device 900), an XR device, a tablet, a network-based server hosting a user-accessible client device, a non-user-owned device, any other suitable device, or any combination thereof.

Control circuitry 904 may be based on any suitable control circuitry such as processing circuitry 907. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i6 processor and an Intel Core i7 processor). In some embodiments, control circuitry 904 executes instructions for the media application stored in memory (e.g., storage 908). Specifically, control circuitry 904 may be instructed by the media application to perform the functions discussed above and below. In some implementations, processing or actions performed by control circuitry 904 may be based on instructions received from the media application.

In client/server-based embodiments, control circuitry 904 may include communications circuitry suitable for communicating with a server or other networks or servers. The media application may be a stand-alone application implemented on a device or a server. The media application may be implemented as software or a set of executable instructions. The instructions for performing any of the embodiments discussed herein of the media application may be encoded on non-transitory computer-readable media (e.g., a hard drive, random-access memory on a DRAM integrated circuit, read-only memory on a BLU-RAY disk, etc.). For example, in FIG. 9, the instructions may be stored in storage 908, and executed by control circuitry 904 of a device 900.

In some embodiments, the media application may be a client/server application where only the client application resides on device 900, and a server application resides on an external server (e.g., server 1004 and/or media content source 1002). For example, the media application may be implemented partially as a client application on control circuitry 904 of device 900 and partially on server 1004 as a server application running on control circuitry 1011. Server 1004 may be a part of a local area network with one or more of devices 900, 901 or may be part of a cloud computing environment accessed via the internet. In a cloud computing environment, various types of computing services for performing searches on the internet or informational databases, providing video communication capabilities, providing storage (e.g., for a database) or parsing data are provided by a collection of network-accessible computing and storage resources (e.g., server 1004 and/or an edge computing device), referred to as "the cloud." Device 900 may be a cloud client that relies on the cloud computing capabilities from server 1004 to generate personalized engagement options in a VR environment. The client application may instruct control circuitry 904 to generate personalized engagement options in a VR environment.

Control circuitry 904 may include communications circuitry suitable for communicating with a server, edge computing systems and devices, a table or database server, or other networks or servers. The instructions for carrying out the above mentioned functionality may be stored on a server (which is described in more detail in connection with FIG. 10). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the internet or any other suitable communication networks or paths (which is described in more detail in connection with FIG. 10). In addition, communications circuitry may include circuitry that enables peer-to-peer communication of user equipment, or communication of user equipment in locations remote from each other (described in more detail below).

Memory may be an electronic storage device provided as storage 908 that is part of control circuitry 904. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 908 may be used to store various types of content described herein as well as media application data described above. Nonvolatile memory may also be used (e.g., to launch a boot-up routine and other instructions). Cloud-based storage, described in relation to FIG. 9, may be used to supplement storage 908 or instead of storage 908. Non-transitory memory may store instructions that when executed by control circuitry, I/O circuitry, any other suitable circuitry or combination thereof, executes functions of a media application as described above.

Control circuitry 904 may include video generating circuitry and tuning circuitry, such as one or more analog tuners, one or more MPEG-2 decoders or MPEG-2 decoders or HEVC decoders or any other suitable digital decoding circuitry, high-definition tuners, or any other suitable tuning or video circuits or combinations of such circuits. Encoding circuitry (e.g., for converting over-the-air, analog, or digital signals to MPEG or HEVC or any other suitable signals for storage) may also be provided. Control circuitry 904 may also include scaler circuitry for upconverting and downconverting content into the preferred output format of user equipment 900. Control circuitry 904 may also include digital-to-analog converter circuitry and analog-to-digital converter circuitry for converting between digital and analog signals. The tuning and encoding circuitry may be used by user equipment 900, 901 to receive and to display, to play, or to record content. The tuning and encoding circuitry may also be used to receive video communication session data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 908 is provided as a separate device from user equipment 900, the tuning and encoding circuitry (including multiple tuners) may be associated with storage 908.

Control circuitry 904 may receive instruction from a user by way of user input interface 910. User input interface 910 may be any suitable user interface, such as a remote control, mouse, trackball, keypad, keyboard, touch screen, touchpad, stylus input, joystick, voice recognition interface, or other user input interfaces. Display 912 may be provided as a stand-alone device or integrated with other elements of each one of user equipment 900 and user equipment 901. For example, display 912 may be a touchscreen or touch-sensitive display. In such circumstances, user input interface 910 may be integrated with or combined with display 912. In some embodiments, user input interface 910 includes a remote-control device having one or more microphones, buttons, keypads, any other components configured to receive user input or combinations thereof. For example, user input interface 910 may include a handheld remote-control device having an alphanumeric keypad and option buttons. In a further example, user input interface 910 may include a handheld remote-control device having a microphone and control circuitry configured to receive and identify voice commands and transmit information to set-top box 915.

Audio output equipment 914 may be integrated with or combined with display 912. Display 912 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 912. Audio output equipment 914 may be provided as integrated with other elements of each one of device 900 and device 901 or may be stand-alone units. An audio component of videos and other content displayed on display 912 may be played through speakers (or headphones) of audio output equipment 914. In some embodiments, audio may be distributed to a receiver (not shown), which processes and outputs the audio via speakers of audio output equipment 914. In some embodiments, for example, control circuitry 904 is configured to provide audio cues to a user, or other audio feedback to a user, using speakers of audio output equipment 914. There may be a separate microphone 916 or audio output equipment 914 may include a microphone configured to receive audio input such as voice commands or speech. For example, a user may speak letters or words that are received by the microphone and converted to text by control circuitry 904. In a further example, a user may voice commands that are received by a microphone and recognized by control circuitry 904. Camera 918 may be any suitable video camera integrated with the equipment or externally connected. Camera 918 may be a digital camera comprising a charge-coupled device (CCD) and/or a complementary metal-oxide semiconductor (CMOS) image sensor. Camera 918 may be an analog camera that converts to digital images via a video card.

The media application may be implemented using any suitable architecture. For example, it may be a stand-alone media application wholly implemented on each one of user equipment 900 and user equipment 901. In such an approach, instructions of the media application may be stored locally (e.g., in storage 908), and data for use by the application is downloaded on a periodic basis (e.g., from an out-of-band feed, from an internet resource, or using another suitable approach). Control circuitry 904 may retrieve instructions of the media application from storage 908 and process the instructions to provide video conferencing functionality and generate any of the displays discussed herein. Based on the processed instructions, control circuitry 904 may determine what action to perform when input is received from user input interface 910. For example, movement of a cursor on a display up/down may be indicated by the processed instructions when user input interface 910 indicates that an up/down button was selected. A media application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 904 may allow a user to provide user profile information or may automatically compile user profile information. For example, control circuitry 904 may access and monitor network data, video data, audio data, processing data, participation data from a conference participant profile. Control circuitry 904 may obtain all or part of other user profiles that are related to a particular user (e.g., via social media networks), and/or obtain information about the user from other sources that control circuitry 904 may access. As a result, a user can be provided with a unified experience across the user's different devices.

In some embodiments, the media application is a client/server-based application. Data for use by a thick or thin client implemented on each one of user equipment 900 and user equipment 901 may be retrieved on-demand by issuing requests to a server remote to each one of user equipment 900 and user equipment 901. For example, the remote server may store the instructions for the media application in a storage device. The remote server may process the stored instructions using circuitry (e.g., control circuitry 904) and generate the displays discussed above and below. The client device may receive the displays generated by the remote server and may display the content of the displays locally on device 900. This way, the processing of the instructions is performed remotely by the server while the resulting displays (e.g., that may include text, a keyboard, or other visuals) are provided locally on device 900. Device 900 may receive inputs from the user via input interface 910 and transmit those inputs to the remote server for processing and generating the corresponding displays. For example, device 900 may transmit a communication to the remote server indicating that an up/down button was selected via input interface 910. The remote server may process instructions in accordance with that input and generate a display of the media application corresponding to the input (e.g., a display that moves a cursor up/down). The generated display is then transmitted to device 900 for presentation to the user.

In some embodiments, the media application may be downloaded and interpreted or otherwise run by an interpreter or virtual machine (run by control circuitry 904). In some embodiments, the media application may be encoded in the ETV Binary Interchange Format (EBIF), received by control circuitry 904 as part of a suitable feed, and interpreted by a user agent running on control circuitry 904. For example, the media application may be an EBIF application. In some embodiments, the media application may be defined by a series of JAVA-based files that are received and run by a local virtual machine or other suitable middleware executed by control circuitry 904. In some of such embodiments (e.g., those employing MPEG-2, MPEG-4, HEVC or any other suitable digital media encoding schemes), the media application may be, for example, encoded and transmitted in an MPEG-2 object carousel with the MPEG audio and video packets of a program.

As shown in FIG. 10, user equipment 1006, 1007, 1008, 1010 (which may correspond to user equipment (e.g., device 104 and device 108 of FIG. 1; device 500 of FIG. 5) may be coupled to communication network 1009. Communication network 1009 may be one or more networks including the internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 1009) may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 10 to avoid overcomplicating the drawing.

Although communications paths are not drawn between user equipment, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment may also communicate with each other directly through an indirect path via communication network 1009.

System 1000 may comprise media content source 1002, one or more servers 1004, and/or one or more edge computing devices. In some embodiments, the media application may be executed at one or more of control circuitry 1011 of server 1004 (and/or control circuitry of user equipment 1006, 1007, 1008, 1010 and/or control circuitry of one or more edge computing devices). In some embodiments, the media content source and/or server 1004 may be configured to host or otherwise facilitate video communication sessions between user equipment 1006, 1007, 1008, 1010 and/or any other suitable user equipment, and/or host or otherwise be in communication (e.g., over network 1009) with one or more social network services.

In some embodiments, server 1004 may include control circuitry 1011 and storage 1014 (e.g., RAM, ROM, Hard Disk, Removable Disk, etc.). Storage 1014 may store one or more databases. Server 1004 may also include an I/O path 1012. In some embodiments, I/O path 1012 is an I/O circuitry. I/O circuitry may be a NIC card, audio output device, mouse, keyboard card, any other suitable I/O circuitry device or combination thereof. I/O path 1012 may provide video conferencing data, device information, or other data, over a local area network (LAN) or wide area network (WAN), and/or other content and data to control circuitry 1011, which may include processing circuitry, and storage 1014. Control circuitry 1011 may be used to send and receive commands, requests, and other suitable data using I/O path 1012, which may comprise I/O circuitry. I/O path 1012 may connect control circuitry 1011 (and specifically control circuitry) to one or more communications paths.

Control circuitry 1011 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 1011 may be distributed across multiple separate processors or processing units, for example, multiple of the same type of processing units (e.g., two Intel Core i7 processors) or multiple different processors (e.g., an Intel Core i6 processor and an Intel Core i7 processor). In some embodiments, control circuitry 1011 executes instructions for an emulation system application stored in memory (e.g., the storage 1014). Memory may be an electronic storage device provided as storage 1014 that is part of control circuitry 1011.

FIG. 11 is a flowchart of a detailed illustrative process 1100 for sharing a counterpart version of a media asset from one device with another device, in accordance with some embodiments of this disclosure. In various embodiments, the individual steps of process 1100 may be implemented by one or more components of the devices and systems of FIGS. 1 and 9-10 and may be performed in combination with any of the other processes and aspects described herein. Although the present disclosure may describe certain steps of process 1100 (and of other processes described herein) as being implemented by certain components of the devices and systems of FIGS. 1 and 9-10, this is for purposes of illustration only. It should be understood that other suitable components of the devices and systems may implement those steps instead.

At 1101, control circuitry (e.g., control circuitry 904 of user equipment device 900, and/or control circuitry 1011 of server 1004, which may correspond to server 1004 of FIG. 10), generates for display via I/O circuitry (e.g., I/O circuitry 902 of FIG. 9) a first media asset on a first device (e.g., device 104 of FIG. 1). For example, the control circuitry generates for display a first media asset (e.g., "All Quiet on the Western Front,"), on a television running a media application running the MRS (e.g., device 104). In some embodiments, the first device (e.g., device 104) running the media application is logged into a user account under a first user profile. For example, the television, (e.g., device 104) is logged into the Doe family Iflix account under Jane's user profile (e.g., as shown in FIG. 1).

At step 1102, the control circuitry determines whether a second device (e.g., device 108 of FIG. 1) that is associated with a second user profile is generating for display a second media asset. At step 1102, control circuitry 904 determines that the second device (e.g., device 108), e.g., a tablet, running the media application is generating for display a second media asset (e.g., "The Last of Us,"). In some embodiments, the second device (e.g., device 108) running the media application is logged into the user account, under a second user profile. For example, the tablet (e.g., device 108) is logged into the Doe family Iflix account under Mom's user profile.

In some embodiments, control circuitry of the first device (e.g., device 104) determines that the second device (e.g., device 108) is generating for display a second media asset by receiving streaming data of the second media asset from an Iflix server, e.g., server 1004. In some embodiments, control circuitry of the first device (e.g., device 104) determines that the second device (e.g., device 108) is generating for display a second media asset by receiving streaming data from second device. At step 1104, control circuitry (e.g., control circuitry 904) determines that the second device (e.g., device 108) is not generating for display a second media asset. In response to determining that the second device is not generating for display a second media asset, control circuitry waits for the second device to generate for display a second media asset.

At step 1106, control circuitry (e.g., control circuitry 904) determines whether the second user profile is designated to share a counterpart version of media that is consumed in association with the second user profile with the first device (e.g., device 104). In some embodiments, the media application employs the methods described above in connection with FIGS. 1-2, e.g., the media application can check the sharing permissions of devices by cross-checking a device's IP address with the user account credentials designated by the first device. At step 1108, control circuitry (e.g., control circuitry 904) determines that the second device (e.g., device 108) is not designated to share a counterpart version of media that is consumed in association with the second user profile with the first device (e.g., device 104). In response to determining that the second device does not have designation, control circuitry waits for the second device logged into the second user profile to receive designation.

At step 1110, control circuitry (e.g., control circuitry 904) identifies a time for the media application to share a counterpart version of a second media asset with the first device (e.g., device 104) based on analyzing at least one of the first media asset or the second media asset. An example implementation of step 1110 is described in connection with FIG. 12 as described below. An example implementation of step 1110 is described in connection with FIG. 13 as described below. In some embodiments, the media application employs the methods described above in connection with FIG. 1. In some embodiments, control circuitry (e.g., control circuitry 904) identifies a time when the first media asset has a low I-frame rate and the second media asset has a high I-frame rate. In some embodiments, control circuitry (e.g., control circuitry 904) identifies a time when the second media asset has metadata that matches data of the first user profile.

In another embodiment, at step 1110, control circuitry (e.g., control circuitry 904) identifies a time for the media application to share a counterpart version of a second media asset with the first device (e.g., device 104) based on a viewing progress of the second media asset for the first user profile. In such embodiments, the control circuitry determines that the second media asset is included in a watch history of both the first user profile and the second user profile. In such embodiments, the control circuitry determines that a viewing progress of the second media asset for the first user profile is greater than a viewing progress of the second media asset for the second user profile. When the control circuitry determines that the viewing progress of the second media asset for the first user profile is greater than the viewing progress of the second media asset for the second user profile, the control circuitry proceeds with identifying a time to share a counterpart version of the second media asset with the first device. Such aspects allow the control circuitry to avoid sharing media assets containing spoilers.

At step 1112, control circuitry (e.g., control circuitry 904) generates for display, at the identified time, an overlay over the display of the first media asset on the first device. In some embodiments, the media application employs the methods described above in connection with FIG. 1. In some embodiments, the overlay comprises the counterpart version of the second media asset generated for display on the second device at the identified time, a plurality of user interface options related to consumption of the second media asset, and information relevant to the second media asset such as the title of the second media asset and a summary of the second media asset. The detailed description of FIG. 1 provides example implementations of the overlay interface.

Figure 12:
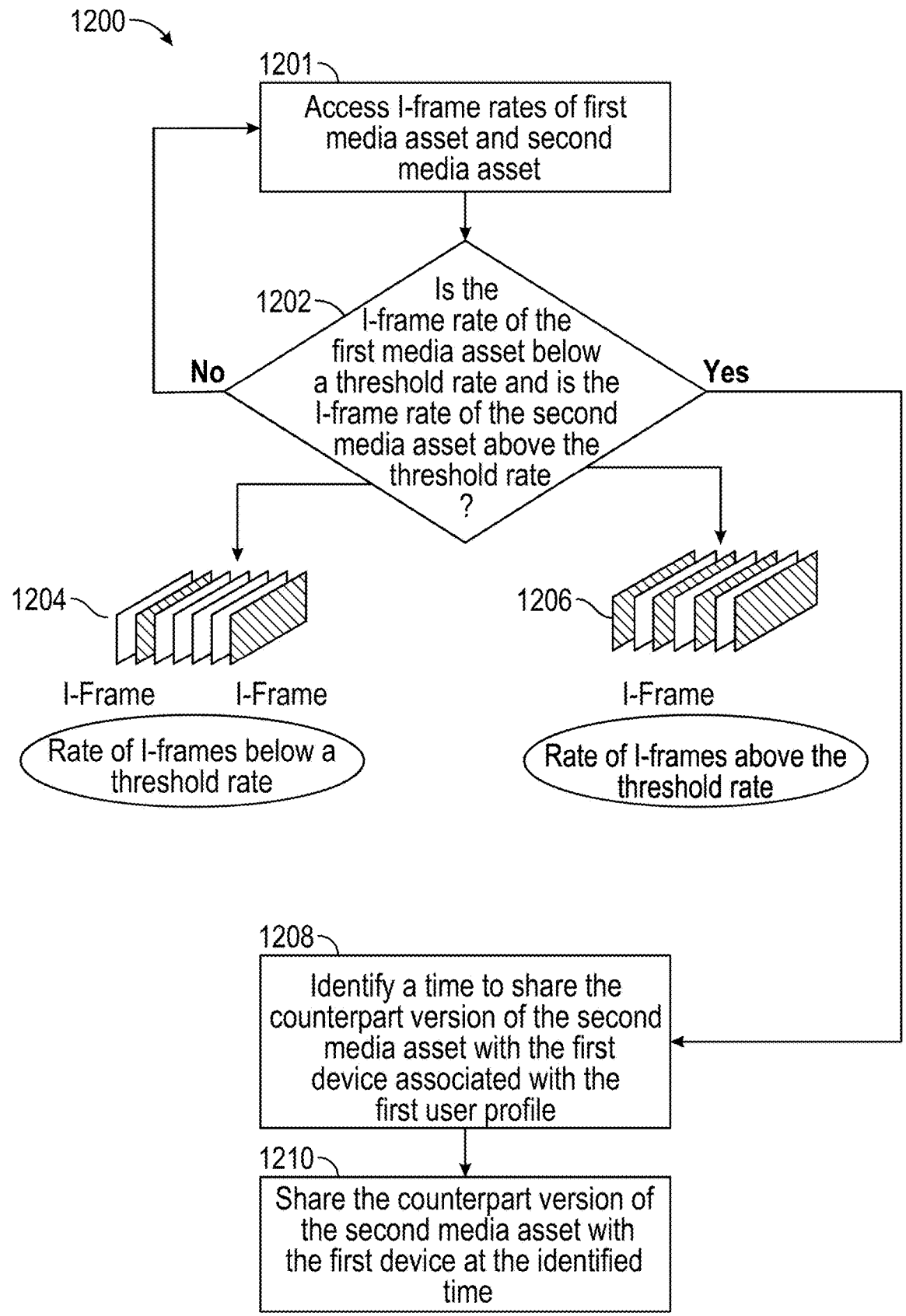
FIG. 12 is a flowchart of an illustrative process for identifying a time to share a counterpart version of a media asset based on I-frame rates, in accordance with some embodiments of this disclosure.

FIG. 12 is a flowchart of a detailed illustrative process 1200 for identifying a time to share a counterpart version of a second media asset with a first device (e.g., device 104) based on analyzing I-frame rates of a first media asset and the second media asset using variable bit rate streaming (VBR). In various embodiments, the individual steps of process 1200 may be implemented by one or more components of the devices and systems of FIGS. 1 and 9-10 and may be performed in combination with any of the other processes and aspects described herein. Although the present disclosure may describe certain steps of process 1200 (and of other processes described herein) as being implemented by certain components of the devices and systems of FIGS. 1 and 9-10, this is for purposes of illustration only. It should be understood that other suitable components of the devices and systems may implement those steps instead. Process 1200 may be an example implementation of step 1110 in connection with FIG. 11 as described above.

At step 1201, control circuitry (e.g., control circuitry 904) accesses I-frame rates of a first media asset and a second media asset from a media application (e.g., Iflix). Video decoding may be done by a CPU, GPU, any other suitable circuitry, such as control circuitry 904, or combination thereof. Decoding one video with high I-frame densities can take much of a CPU's resources, let alone decoding two videos with dense I-frames. If both the first and second media asset had high I-frame frequencies, the CPU's resources may be overloaded and lead to degraded frame rate or yield artifacts. Thus, it is beneficial to limit the decoding load of the CPU. Control circuitry (e.g., control circuitry 904) generates for display the first media asset at a first device running the media application (e.g., device 104) and the second media asset at a second device running the media application (e.g., device 108). In some embodiments, the media application employs the methods described above in connection with FIG. 1. In some embodiments, control circuitry (e.g., control circuitry 904) accesses the metadata of the first media asset and the second media asset from a server (e.g., server 1004). In some embodiments, control circuitry determines at step 1202 if the I-frame rate of the first media asset is below a threshold rate and the I-frame rate of the second media asset is above the threshold rate. In some embodiments, control circuitry determines if the I-frame rate of the first media asset is above a threshold rate and the I-frame rate of the second media asset is below the threshold rate.

In some embodiments, the threshold rate is accessed by control circuitry from the media application. In some embodiments, the threshold rate is determined by control circuitry of the media application based on relative I-frame rates of the media assets. 1204 displays an example rate of I-frames below the threshold rate. 1206 displays an example rate of I-frames above the threshold rate. At step 1202, if the control circuitry determines that the I-frame rates of the first media asset and the second media asset do not have an inverse relationship, step 1201 is repeated until the I-frame rates have the correct relationship.

In some embodiments, in response to the control circuitry determining that the I-frame rate of the first media asset is below a threshold rate and the I-frame rate of the second media asset is above the threshold rate, control circuitry (e.g., control circuitry 904) identifies the time as the identified time to share a counterpart version of the second media asset with the first device (e.g., device 104) that is currently generating for display the first media asset. At step 1210, control circuitry (e.g., control circuitry 904) generates for display the counterpart version of the second media asset at the first device at the identified time.

Figure 13:
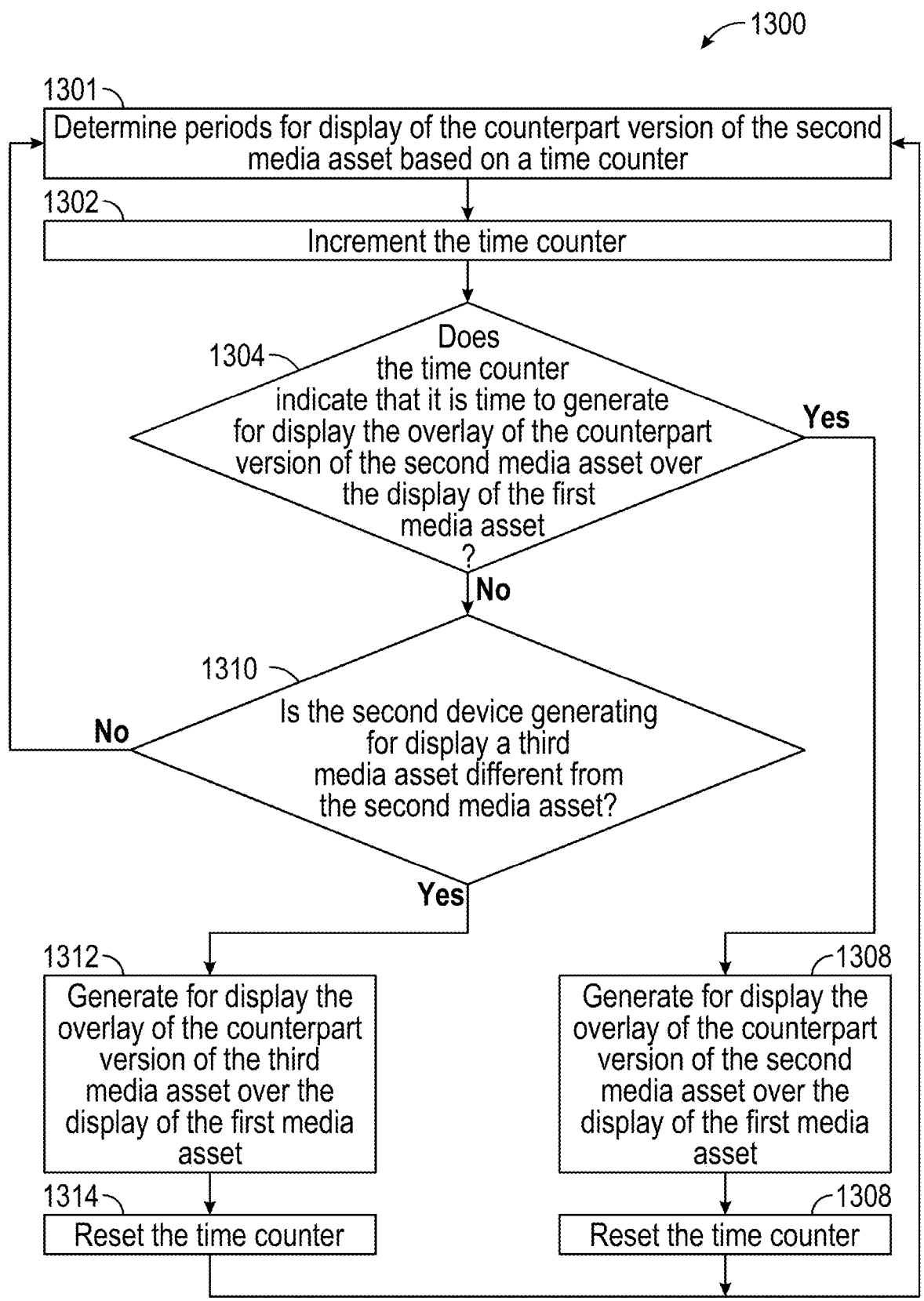
FIG. 13 is a flowchart of an illustrative process for periodically generating for display a counterpart version of a media asset, in accordance with some embodiments of this disclosure.

FIG. 13 is a flowchart of a detailed illustrative process 1300 for generating for display an overlay of a counterpart version of a second media asset periodically based on a time counter. In various embodiments, the individual steps of process 1300 may be implemented by one or more components of the devices and systems of FIGS. 1 and 9-10 and may be performed in combination with any of the other processes and aspects described herein. Although the present disclosure may describe certain steps of process 1300 (and of other processes described herein) as being implemented by certain components of the devices and systems of FIGS. 1 and 9-10, this is for purposes of illustration only. It should be understood that other suitable components of the devices and systems may implement those steps instead. Process 1300 may be an example implementation of step 1110 in connection with FIG. 11 as described above.

At step 1301, control circuitry (e.g., control circuitry 904) determines periods for display of the counterpart version of the second media asset based on a time counter. In some embodiments, the media application employs the methods described above in connection with FIG. 1. In some embodiments, control circuitry determines periods for display based on metadata of the second media asset and the first media asset. Control circuitry may determine periods for display based on a second device (e.g., device 108) switching the media asset being generated for display as described in connection with step 1310. At step 1302, control circuitry (e.g., control circuitry 904) increments a time counter. In some embodiments, control circuitry increments the time counter (e.g., in units of seconds or minutes) in response to the first device (e.g., device 104) generating for display a counterpart version of the second media asset.

At step 1304, control circuitry determines whether the time counter is above a threshold time count. In some embodiments, control circuitry determines a threshold time count based on metadata and/or data of the first media asset and the second media asset. For example, as described in connection with FIG. 12, periods of display may be determined by I-frame rates pf the first media asset and the second media asset. In some embodiments, control circuitry (e.g., control circuitry 904) identifies a threshold time count from the media application (e.g., fifteen minutes).

At step 1310, in response to control circuitry (e.g., control circuitry 904) determining that the time counter does not indicate that it is time to generate for display the overlay of the counterpart version of the second media asset, control circuitry determines whether the second device is generating for display a third media asset different than the second media asset. For example, the second device signed into the second user profile goes from generating for display "The Last of Us" (e.g., a second media asset) to "Friends" (e.g., a third media asset). At step 1312, in response to control circuitry (e.g., control circuitry 904) determining that the second device is generating for display a third media asset different than the second media asset, control circuitry generates for display an overlay of a counterpart version of the third media asset over the display of the first media asset at the first device (e.g., device 104). At step 1314, control circuitry resets the time counter to zero and process 1300 begins again.

At step 1306, in response to control circuitry (e.g., control circuitry 904) determining that the time counter indicates that it is time to generate for display the overlay of the counterpart version of the second media asset, control circuitry generates for display the overlay of the counterpart version of the second media asset over the display of the first media asset at the first device (e.g., device 104). For example, the first device generates for display the counterpart version of "The Last of Us" (e.g., a second media asset) each time the time counter exceeds a time period (e.g., twenty minutes). At step 1308, control circuitry resets the time counter to zero and process 1300 begins again.

Figure 14:
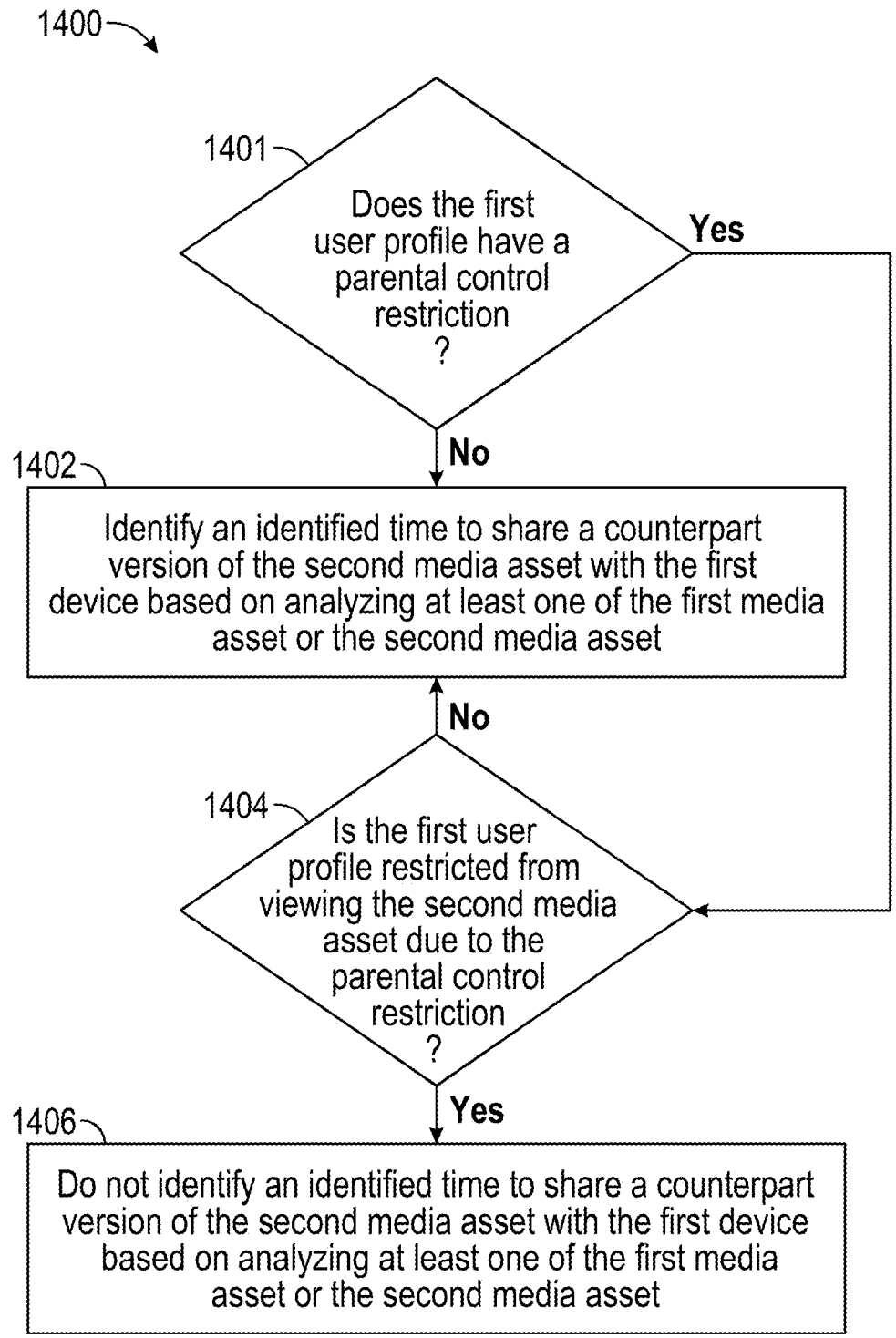
FIG. 14 is a flowchart of an illustrative process for sharing a counterpart version of a media asset based on parental control restrictions, in accordance with some embodiments of this disclosure.

FIG. 14 is a flowchart of a detailed illustrative process 1400 for assessing parental control restrictions. In various embodiments, the individual steps of process 1400 may be implemented by one or more components of the devices and systems of FIGS. 1 and 9-10 and may be performed in combination with any of the other processes and aspects described herein. Although the present disclosure may describe certain steps of process 1400 (and of other processes described herein) as being implemented by certain components of the devices and systems of FIGS. 1 and 9-10, this is for purposes of illustration only. It should be understood that other suitable components of the devices and systems may implement those steps instead. In some embodiments, process 1400 may occur between steps 1106 and 1110 in connection with FIG. 11 as described above.

At step 1401, control circuitry (e.g., control circuitry 904) determines whether the first user profile that is logged into at the first device has parental control restrictions. In some embodiments, parental control restrictions comprise content filters based on media asset ratings and/or subject matter. For example, a parent using a device logged into a master user profile running the media application sets a parental control restriction on a child's user profile for media assets rated R. If a child's user profile has a parental control restriction set and a parent's user profile is currently consuming a media asset with a restricted rating, the media application will not allow a counterpart version of the restricted media asset to be generated for display at a device signed into the child's user profile.

At step 1402, in response to determining that the first user profile does not have parental control restrictions, control circuitry (e.g., control circuitry 904) identifies a time to share a counterpart version of the second media asset with the first device signed into the first user profile. In some embodiments, the media application employs the methods described above in connection with FIGS. 1 and 12.

At step 1404, in response to determining that the first user profile does have parental control restrictions, control circuitry (e.g., control circuitry 904) determines whether the first user profile has parental control restrictions that restrict it from viewing the second media asset. For example, control circuitry determines that the show "The Last of Us" is rated TV-MA, which is a restricted content rating for a child user profile by a master, e.g., parent, user profile. In some embodiments, in response to determining that the first user profile has parental control restrictions that restrict it from viewing the second media asset, at step 1406 control circuitry does not identify a time to share a counterpart version of the second media asset with the first device logged into the first user profile. For example, the media application will not generate for display a counterpart version of "The Last of Us" with the first user profile because it has a restricted rating.

In some embodiments, control circuitry (e.g., control circuitry 904) determines that the first user profile is not restricted from viewing the second media asset based on parental control restrictions. For example, control circuitry determines that the movie "Shrek" is rated G, which is not restricted from the first user profile via parental control restrictions. Thus, control circuitry moves from step 1404 to step 1402 and identifies a time to share a counterpart version of the second media asset the first device.

What is claimed is:

1. A method comprising:
generating for display a first media asset on a first device, wherein the first device is associated with a first user profile;
determining that a second device that is associated with a second user profile is generating for display a second media asset and the second user profile is designated to share, with the first device, a counterpart version of media that is consumed in association with the second user profile;
identifying, based on analyzing at least one of the first media asset or the second media asset, an identified time to share a counterpart version of the second media asset with the first device associated with the first user profile, wherein the identifying the identified time further comprises identifying a time when the second device is generating for display a portion of the second media asset associated with metadata that corresponds to data in the first user profile; and
at the identified time, generating for display an overlay over the display of the first media asset on the first device, wherein the overlay comprises:
the counterpart version of the second media asset generated for display on the second device; and
a plurality of user interface options related to consumption of the second media asset.

2. A method comprising:
generating for display a first media asset on a first device, wherein the first device is associated with a first user profile;

determining that a second device that is associated with a second user profile is generating for display a second media asset and the second user profile is designated to share, with the first device, a counterpart version of media that is consumed in association with the second user profile;

identifying, based on analyzing at least one of the first media asset or the second media asset, an identified time to share a counterpart version of the second media asset with the first device associated with the first user profile; and at the identified time, generating for display an overlay over the display of the first media asset on the first device, wherein the overlay comprises:

the counterpart version of the second media asset generated for display on the second device;

a plurality of user interface options related to consumption of the second media asset; and wherein the generating for display the overlay over the display of the first media asset on the first device further comprises:

generating for display the overlay over the display of the first media asset on the first device, wherein the overlay comprises display of the counterpart version of the second media asset that is synchronized with display of the second media asset at the second device.

3. The method of claim 1, wherein the generating for display the overlay over the display of the first media asset on the first device further comprises:

generating for display the overlay over the display of the first media asset on the first device, wherein the overlay comprises display of the counterpart version of the second media asset that is offset in time from display of the second media asset at the second device.

4. The method of claim 1, wherein the determining that the second user profile is designated to share, with the first device, the counterpart version of media that is consumed in association with the second user profile further comprises:

determining that the first user profile and the second user profile belong to a single user account for accessing a media delivery provider.

5. The method of claim 1, wherein the generating for display the overlay further comprises generating for display a current geographic location of the second device associated with the second user profile;

wherein the generating for display the plurality of user interface options related to consumption of the second media asset comprises:

generating for display an option to log out the second user profile of a user account; and generating for display an option to change a password of the user account.

6. The method of claim 1, wherein the determining that the second user profile is designated to share, with the first device, the counterpart version of media that is consumed in association with the second user profile further comprises:

receiving, via a social networking application, a request from the first user profile to follow the second user profile; and in response to the receiving, authorizing the second user profile to share the counterpart version of media that is consumed in association with the second user profile.

7. The method of claim 1, wherein the generating for display the overlay over the display of the first media asset on the first device further comprises:

generating for display, at the first device, an option to like the second media asset; and in response to receiving a like of the second media asset at the first device, sending a notification to the second device that the first user profile likes the second media asset.

8. The method of claim 1, wherein the identifying the identified time further comprises:

identifying a particular time:

when the first media asset on the first device associated with the first user profile is displaying a slow-paced scene; and when the second device associated with the second user profile is displaying a high-paced scene; and identifying the particular time as the identified time.

9. The method of claim 8, further comprising:

determining that the first device associated with the first user profile is displaying the slow-paced scene by determining that a rate of I-frames in the first media asset is below a threshold rate; and determining that the second device associated with the second user profile is displaying the high-paced scene by determining that a rate of I-frames in the second media asset is above the threshold rate.

10. The method of claim 1, wherein the generating for display the overlay further comprises:

generating for display the overlay for a period of time, wherein the period of time is determined based on at least one of:

a length of a currently-playing scene of the first media asset; or a length of a currently-playing scene of the counterpart version of the second media asset.

11. The method of claim 1, wherein the plurality of user interface options related to consumption of the second media asset comprises:

an option to terminate display of the overlay;

an option to add the second media asset to a watch list associated with the first user profile;

an option to minimize display of the overlay; and an option to receive metadata of the second media asset.

12. The method of claim 1, wherein the plurality of user interface options related to consumption of the second media asset comprises:

an option to terminate the generating for display the first media asset and begin generating for display the second media asset at the first device; and an option to send a notification to the second device to join a watch party of the second media asset with the first device.

13. The method of claim 1, wherein the generating for display the overlay further comprises:

receiving a selection of an option to terminate display of the overlay; and in response to the receiving the selection, terminating display of the overlay.

14. The method of claim 1, wherein the generating for display the overlay further comprises:

detecting an orientation of the second device during consumption of the second media asset; and generating for display a picture-in-picture display of the counterpart version of the second media asset in the orientation of the second device.

15. The method of claim 1, further comprising:

in response to the generating for display the overlay, notifying the second device that the first device is generating for display the overlay.

16. The method of claim 1, further comprising:
periodically generating for display the overlay of the counterpart version of the second media asset over the display of the first media asset, wherein periods for the periodic generation for display of the counterpart version of the second media asset are determined based on a time counter;
in response to determining that the second device is generating for display a third media asset different from the second media asset:
resetting the time counter; and
periodically generating for display an overlay of a counterpart version of the third media asset over the display of the first media asset, wherein periods for the periodic generation for display of the counterpart version of the third media asset are determined based on the reset time counter.

17. The method of claim 1, wherein the generating for display the overlay is performed in response to determining that the second media asset is included in a watch history of both the first user profile and the second user profile and that a viewing progress of the second media asset for the first user profile is greater than a viewing progress of the second media asset for the second user profile.

18. The method of claim 1, wherein the generating for display the overlay is performed in response to determining that the second media asset is not included in a watch history of the first user profile.

19. A system comprising:
input/output circuitry configured to:
generate for display a first media asset on a first device, wherein the first device is associated with a first user profile;
control circuitry configured to:
determine that a second device that is associated with a second user profile is generating for display a second media asset and the second user profile is designated to share, with the first device, a counterpart version of media that is consumed in association with the second user profile;
identify, based on analyzing at least one of the first media asset or the second media asset, an identified time to share a counterpart version of the second media asset with the first device associated with the first user profile, wherein the identifying the identified time further comprises identifying a time when the second device is generating for display a portion of the second media asset associated with metadata that corresponds to data in the first user profile; and
wherein the input/output circuitry is further configured to:
at the identified time, generate for display an overlay over the display of the first media asset on the first device, wherein the overlay comprises:
the counterpart version of the second media asset generated for display on the second device; and
a plurality of user interface options related to consumption of the second media asset.

\* \* \* \* \*